(12) United States Patent
Ford

(10) Patent No.: US 11,082,440 B2
(45) Date of Patent: *Aug. 3, 2021

(54) USER PROFILE DEFINITION AND MANAGEMENT

(71) Applicant: Forcepoint, LLC, Austin, TX (US)

(72) Inventor: Richard Anthony Ford, Austin, TX (US)

(73) Assignee: Forcepoint LLC, Austin, TX (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/592,888

(22) Filed: Oct. 4, 2019

(65) Prior Publication Data

US 2020/0036740 A1    Jan. 30, 2020

Related U.S. Application Data

(63) Continuation of application No. 15/979,023, filed on May 14, 2018, now Pat. No. 10,447,718, which is a continuation-in-part of application No. 15/958,738, filed on Apr. 20, 2018, now Pat. No. 10,264,012.

(60) Provisional application No. 62/506,300, filed on May 15, 2017.

(51) Int. Cl.
*H04L 29/06*    (2006.01)
*H04L 29/08*    (2006.01)

(52) U.S. Cl.
CPC ...... *H04L 63/1425* (2013.01); *H04L 63/1416* (2013.01); *H04L 63/1441* (2013.01); *H04L 67/10* (2013.01); *H04L 67/22* (2013.01); *H04L 67/306* (2013.01)

(58) Field of Classification Search
CPC . H04L 63/1425; H04L 67/10; H04L 63/1416; H04L 67/306; H04L 67/22; H04L 63/1441
See application file for complete search history.

(56) References Cited

U.S. PATENT DOCUMENTS

| | | |
|---|---|---|
| 7,395,201 B2 | 7/2008 | Shaw |
| 7,506,371 B1 | 3/2009 | Ben-Natan |
| 7,805,391 B2 | 9/2010 | Friedlander et al. |
| 7,895,448 B1 | 2/2011 | Satish |
| 8,082,349 B1 | 12/2011 | Bhargava et al. |
| 8,176,159 B2 | 5/2012 | Kashi |

(Continued)

OTHER PUBLICATIONS

Guardtime.com, KSI Blockchain Technology, printed Jul. 13, 2017.
(Continued)

*Primary Examiner* — Darren B Schwartz
(74) *Attorney, Agent, or Firm* — Terrile, Cannatti & Chambers; Stephen A. Terrile

(57) ABSTRACT

A method, system and computer-usable medium for performing a security analysis operation within a security environment, comprising: monitoring electronically-observable user behavior about a particular entity; maintaining a state about the particular entity, the state representing a context of a particular event; converting the electronically-observable user behavior into electronic information representing the electronically-observable user behavior; generating a user behavior profile based upon the electronic information representing the electronically-observable user behavior; and, analyzing the event using the state of the entity and the user behavior profile.

20 Claims, 11 Drawing Sheets

(56) References Cited

U.S. PATENT DOCUMENTS

| | | |
|---|---|---|
| 8,214,364 B2 | 7/2012 | Bigus et al. |
| 8,549,629 B1 | 10/2013 | McCreesh et al. |
| 8,640,231 B2 | 1/2014 | Florencio et al. |
| 8,775,162 B2 | 7/2014 | Shaw |
| 8,918,903 B1 | 12/2014 | Schepis et al. |
| 8,963,806 B1 | 2/2015 | Starner et al. |
| 8,966,036 B1 | 2/2015 | Asgekar et al. |
| 9,130,986 B2 | 9/2015 | Troyansky |
| 9,224,008 B1 | 12/2015 | De et al. |
| 9,253,181 B2 | 2/2016 | Liu et al. |
| 9,275,345 B1 | 3/2016 | Song et al. |
| 9,393,488 B2 | 7/2016 | Brownlow et al. |
| 9,514,293 B1 | 12/2016 | Moritz et al. |
| 9,516,035 B1 | 12/2016 | Moritz et al. |
| 9,614,920 B1 | 4/2017 | Agarwal et al. |
| 9,665,733 B1 | 5/2017 | Sills et al. |
| 9,742,871 B1 | 8/2017 | Gibson et al. |
| 9,798,757 B2 | 10/2017 | Greene et al. |
| 9,798,883 B1 | 10/2017 | Gil et al. |
| 9,911,290 B1 | 3/2018 | Zalewski et al. |
| 10,013,728 B2 | 7/2018 | Schechter et al. |
| 10,019,561 B1 | 7/2018 | Shelton et al. |
| 10,020,076 B1 | 7/2018 | Anumalasetty et al. |
| 10,044,745 B1 | 8/2018 | Jones et al. |
| 10,049,664 B1 | 8/2018 | Indyk |
| 10,052,026 B1 | 8/2018 | Tran |
| 10,057,227 B1 | 8/2018 | Hess et al. |
| 10,061,916 B1 | 8/2018 | Jiang et al. |
| 10,063,562 B1 | 8/2018 | Molina-Markham et al. |
| 10,063,654 B2 | 8/2018 | Kirti et al. |
| 10,091,180 B1 | 10/2018 | Moritz et al. |
| 10,110,942 B2 | 10/2018 | Lyons et al. |
| 10,114,935 B2 | 10/2018 | Das et al. |
| 10,116,680 B1 | 10/2018 | Han et al. |
| 10,165,065 B1 | 12/2018 | Anantharaju et al. |
| 10,237,256 B1 | 3/2019 | Pena et al. |
| 10,237,298 B1 | 3/2019 | Nguyen et al. |
| 10,320,813 B1 | 6/2019 | Ahmed et al. |
| 10,325,209 B2 | 6/2019 | Sanchez et al. |
| 10,397,255 B1 | 8/2019 | Bhalotra et al. |
| 10,417,613 B1 | 9/2019 | Brisebois et al. |
| 10,424,296 B2 | 9/2019 | Penilla et al. |
| 10,614,029 B2 | 4/2020 | DiRienzo |
| 10,726,325 B2 | 7/2020 | Krishnamurthy et al. |
| 2001/0040591 A1 | 11/2001 | Abbott et al. |
| 2002/0083025 A1 | 6/2002 | Robarts et al. |
| 2002/0173295 A1 | 11/2002 | Nykanen et al. |
| 2003/0154406 A1 | 8/2003 | Honarvar et al. |
| 2003/0204720 A1 | 10/2003 | Schoen et al. |
| 2003/0212546 A1 | 11/2003 | Shaw |
| 2003/0217024 A1 | 11/2003 | Kocher |
| 2004/0186809 A1 | 9/2004 | Schlesinger et al. |
| 2004/0225877 A1 | 11/2004 | Huang |
| 2005/0008148 A1 | 1/2005 | Jacobson |
| 2005/0044426 A1 | 2/2005 | Vogel et al. |
| 2005/0097364 A1 | 5/2005 | Edeki et al. |
| 2006/0129817 A1 | 6/2006 | Bomeman et al. |
| 2006/0136332 A1 | 6/2006 | Ziegler |
| 2006/0190822 A1 | 8/2006 | Sasson et al. |
| 2006/0195328 A1 | 8/2006 | Abraham et al. |
| 2006/0200435 A1 | 9/2006 | Flinn et al. |
| 2006/0230071 A1 | 10/2006 | Kass et al. |
| 2007/0067853 A1 | 3/2007 | Ramsey |
| 2007/0136573 A1 | 6/2007 | Steinberg |
| 2007/0179351 A1 | 8/2007 | Kil et al. |
| 2007/0206741 A1 | 9/2007 | Tiliks et al. |
| 2008/0052288 A1 | 2/2008 | Flinn et al. |
| 2008/0065759 A1 | 3/2008 | Gassewitz et al. |
| 2008/0104415 A1 | 5/2008 | Palti-Wasserman et al. |
| 2008/0148376 A1 | 6/2008 | Onozawa et al. |
| 2008/0170776 A1 | 7/2008 | Albertson et al. |
| 2008/0218472 A1 | 9/2008 | Breen et al. |
| 2008/0271143 A1 | 10/2008 | Stephens et al. |
| 2008/0313500 A1 | 12/2008 | Strauss et al. |
| 2009/0023422 A1 | 1/2009 | Macinnis et al. |
| 2009/0149247 A1 | 6/2009 | Esbensen et al. |
| 2009/0177626 A1 | 7/2009 | Lottero |
| 2009/0177979 A1 | 7/2009 | Garbow et al. |
| 2009/0199264 A1 | 8/2009 | Lang |
| 2009/0199296 A1 | 8/2009 | Xie et al. |
| 2009/0292659 A1 | 11/2009 | Jung et al. |
| 2009/0292743 A1 | 11/2009 | Bigus et al. |
| 2009/0293121 A1 | 11/2009 | Bigus et al. |
| 2010/0070456 A1* | 3/2010 | Sugihara ............ H04L 67/22 706/54 |
| 2010/0115610 A1 | 5/2010 | Tredoux et al. |
| 2010/0146622 A1 | 6/2010 | Nordstrom et al. |
| 2010/0205667 A1 | 8/2010 | Anderson et al. |
| 2010/0257580 A1 | 10/2010 | Zhao |
| 2010/0269175 A1 | 10/2010 | Stolfo et al. |
| 2010/0331146 A1 | 12/2010 | Kil |
| 2010/0332550 A1 | 12/2010 | Ainslie |
| 2011/0004520 A1 | 1/2011 | Chou et al. |
| 2011/0016534 A1 | 1/2011 | Jakobsson et al. |
| 2011/0022443 A1 | 1/2011 | Partridge et al. |
| 2011/0106829 A1 | 5/2011 | Pradhan et al. |
| 2011/0138366 A1 | 6/2011 | Wintergerst et al. |
| 2011/0173084 A1 | 7/2011 | Cheng et al. |
| 2011/0185421 A1 | 7/2011 | Wittenstein et al. |
| 2011/0212770 A1 | 9/2011 | Ocko et al. |
| 2011/0221568 A1 | 9/2011 | Giobbi |
| 2011/0231770 A1 | 9/2011 | Tovar |
| 2011/0296003 A1 | 12/2011 | McCann et al. |
| 2011/0320816 A1 | 12/2011 | Yao et al. |
| 2012/0060219 A1 | 3/2012 | Larsson et al. |
| 2012/0079045 A1 | 3/2012 | Plotkin |
| 2012/0084349 A1 | 4/2012 | Lee et al. |
| 2012/0101970 A1 | 4/2012 | Zernik et al. |
| 2012/0131657 A1 | 5/2012 | Sunstein et al. |
| 2012/0137367 A1 | 5/2012 | Dupont et al. |
| 2012/0144468 A1 | 6/2012 | Pratt et al. |
| 2012/0185910 A1 | 7/2012 | Miettinen et al. |
| 2012/0258437 A1 | 10/2012 | Sadeh-Koniecpol et al. |
| 2012/0281885 A1 | 11/2012 | Syrdal et al. |
| 2012/0284776 A1 | 11/2012 | Sundaram et al. |
| 2012/0297477 A1 | 11/2012 | Raviv |
| 2013/0024239 A1 | 1/2013 | Baker et al. |
| 2013/0042327 A1 | 2/2013 | Chow |
| 2013/0044055 A1 | 2/2013 | Karmarkar et al. |
| 2013/0055348 A1 | 2/2013 | Strauss et al. |
| 2013/0055367 A1 | 2/2013 | Kshirsagar et al. |
| 2013/0072169 A1 | 3/2013 | Ross et al. |
| 2013/0086167 A1 | 4/2013 | Blom |
| 2013/0091088 A1 | 4/2013 | Forman et al. |
| 2013/0091539 A1 | 4/2013 | Khurana et al. |
| 2013/0097237 A1 | 4/2013 | Kothari et al. |
| 2013/0097701 A1 | 4/2013 | Moyle et al. |
| 2013/0111586 A1 | 5/2013 | Jackson |
| 2013/0117214 A1 | 5/2013 | Davis et al. |
| 2013/0124538 A1 | 5/2013 | Lee et al. |
| 2013/0133054 A1 | 5/2013 | Davis et al. |
| 2013/0142363 A1 | 6/2013 | Amento et al. |
| 2013/0151515 A1 | 6/2013 | Davis et al. |
| 2013/0191898 A1 | 7/2013 | Kraft |
| 2013/0238540 A1 | 9/2013 | O'Donoghue et al. |
| 2013/0252737 A1 | 9/2013 | Mescon et al. |
| 2013/0263206 A1 | 10/2013 | Nefedov et al. |
| 2013/0291099 A1 | 10/2013 | Donfried et al. |
| 2013/0303159 A1 | 11/2013 | Gathala et al. |
| 2013/0305357 A1 | 11/2013 | Ayyagari et al. |
| 2013/0305359 A1 | 11/2013 | Gathala et al. |
| 2014/0040309 A1 | 2/2014 | Meaney et al. |
| 2014/0040989 A1 | 2/2014 | Davis et al. |
| 2014/0052465 A1 | 2/2014 | Madan et al. |
| 2014/0053261 A1 | 2/2014 | Gupta et al. |
| 2014/0095419 A1 | 4/2014 | Gandhi et al. |
| 2014/0096215 A1 | 4/2014 | Hessler |
| 2014/0114899 A1 | 4/2014 | Wan et al. |
| 2014/0199663 A1 | 7/2014 | Sadeh-Koniecpol et al. |
| 2014/0207724 A1 | 7/2014 | Ledenev et al. |
| 2014/0282964 A1 | 9/2014 | Stubblefield et al. |
| 2014/0283016 A1 | 9/2014 | Sambamurthy et al. |
| 2014/0317081 A1 | 10/2014 | Dubois-Ferriere et al. |
| 2014/0317726 A1 | 10/2014 | Turgeman et al. |

(56) References Cited

U.S. PATENT DOCUMENTS

| | | | |
|---|---|---|---|
| 2014/0317734 A1 | 10/2014 | Valencia et al. |
| 2014/0323106 A1 | 10/2014 | Nunally |
| 2014/0325223 A1 | 10/2014 | Turgeman et al. |
| 2014/0333415 A1 | 11/2014 | Kursun |
| 2014/0344015 A1 | 11/2014 | Puertolas-Montanes et al. |
| 2014/0347479 A1 | 11/2014 | Givon |
| 2015/0033305 A1 | 1/2015 | Shear et al. |
| 2015/0067845 A1 | 3/2015 | Chari et al. |
| 2015/0073920 A1 | 3/2015 | Pashkevich et al. |
| 2015/0082441 A1 | 3/2015 | Gathala et al. |
| 2015/0096002 A1 | 4/2015 | Shuart et al. |
| 2015/0106888 A1 | 4/2015 | Cheng et al. |
| 2015/0109104 A1 | 4/2015 | Fadell et al. |
| 2015/0154494 A1 | 6/2015 | Medvedovsky et al. |
| 2015/0161386 A1 | 6/2015 | Gupta et al. |
| 2015/0180894 A1 | 6/2015 | Sadovsky et al. |
| 2015/0205944 A1* | 7/2015 | Turgeman ............ G06F 21/554 726/7 |
| 2015/0205957 A1 | 7/2015 | Turgeman et al. |
| 2015/0205958 A1 | 7/2015 | Turgeman et al. |
| 2015/0206102 A1 | 7/2015 | Cama et al. |
| 2015/0213246 A1 | 7/2015 | Turgeman et al. |
| 2015/0220734 A1 | 8/2015 | Nalluri et al. |
| 2015/0242605 A1 | 8/2015 | Du et al. |
| 2015/0242621 A1 | 8/2015 | Jackson et al. |
| 2015/0244821 A1 | 8/2015 | Burger |
| 2015/0249718 A1 | 9/2015 | Huybregts et al. |
| 2015/0254467 A1 | 9/2015 | Leuthardt et al. |
| 2015/0310196 A1 | 10/2015 | Turgeman et al. |
| 2015/0324563 A1 | 11/2015 | Deutschmann et al. |
| 2015/0338917 A1 | 11/2015 | Steiner et al. |
| 2015/0339477 A1 | 11/2015 | Abrams et al. |
| 2015/0339673 A1 | 11/2015 | Adjaoute |
| 2015/0358317 A1 | 12/2015 | Deutschmann et al. |
| 2015/0363770 A1 | 12/2015 | Ronca et al. |
| 2016/0029221 A1 | 1/2016 | Suarez Garcia et al. |
| 2016/0110528 A1 | 4/2016 | Gupta et al. |
| 2016/0110551 A1 | 4/2016 | Fugate et al. |
| 2016/0117500 A1 | 4/2016 | Li et al. |
| 2016/0125176 A1 | 5/2016 | Scea et al. |
| 2016/0197904 A1 | 7/2016 | Taratine et al. |
| 2016/0197918 A1 | 7/2016 | Turgeman et al. |
| 2016/0203316 A1 | 7/2016 | Mace et al. |
| 2016/0210407 A1 | 7/2016 | Hwang et al. |
| 2016/0212172 A1 | 7/2016 | Senanayake et al. |
| 2016/0232352 A1 | 8/2016 | Chen et al. |
| 2016/0234184 A1 | 8/2016 | Liu et al. |
| 2016/0239857 A1 | 8/2016 | Milton et al. |
| 2016/0241579 A1 | 8/2016 | Roosenraad et al. |
| 2016/0294959 A1 | 10/2016 | Cho |
| 2016/0306844 A1 | 10/2016 | Frank et al. |
| 2016/0306974 A1 | 10/2016 | Turgeman et al. |
| 2016/0330217 A1* | 11/2016 | Gates ............... H04L 63/08 |
| 2016/0337390 A1 | 11/2016 | Sridhara et al. |
| 2016/0337399 A1 | 11/2016 | Kamath et al. |
| 2016/0352760 A1 | 12/2016 | Mrkos et al. |
| 2017/0010665 A1 | 1/2017 | Tanaka et al. |
| 2017/0032248 A1 | 2/2017 | Dotan-Cohen et al. |
| 2017/0033932 A1 | 2/2017 | Truu et al. |
| 2017/0041148 A1 | 2/2017 | Pearce |
| 2017/0063886 A1 | 3/2017 | Muddu et al. |
| 2017/0085587 A1 | 3/2017 | Turgeman |
| 2017/0091450 A1 | 3/2017 | Turgeman |
| 2017/0111506 A1 | 4/2017 | Strong et al. |
| 2017/0134412 A1 | 5/2017 | Cheng et al. |
| 2017/0140279 A1 | 5/2017 | Turgeman |
| 2017/0154366 A1 | 6/2017 | Turgeman |
| 2017/0161478 A1 | 6/2017 | Stavrou et al. |
| 2017/0161503 A1 | 6/2017 | Seigel et al. |
| 2017/0177884 A1 | 6/2017 | Mehta et al. |
| 2017/0180336 A1 | 6/2017 | Josephson et al. |
| 2017/0180407 A1 | 6/2017 | Zage et al. |
| 2017/0230391 A1 | 8/2017 | Ferguson et al. |
| 2017/0230417 A1 | 8/2017 | Amar et al. |
| 2017/0230418 A1 | 8/2017 | Amar et al. |
| 2017/0243223 A1 | 8/2017 | Kolotinsky et al. |
| 2017/0244718 A1 | 8/2017 | Andreeva et al. |
| 2017/0251008 A1 | 8/2017 | Andreeva et al. |
| 2017/0257358 A1 | 9/2017 | Ebrahimi et al. |
| 2017/0277996 A1 | 9/2017 | Vogel et al. |
| 2017/0279801 A1 | 9/2017 | Andrade |
| 2017/0286671 A1 | 10/2017 | Chari et al. |
| 2018/0007053 A1 | 1/2018 | Grant et al. |
| 2018/0013780 A1 | 1/2018 | Mao et al. |
| 2018/0018456 A1 | 1/2018 | Chen et al. |
| 2018/0034850 A1 | 2/2018 | Turgeman |
| 2018/0039990 A1 | 2/2018 | Lindemann |
| 2018/0060569 A1 | 3/2018 | Kim et al. |
| 2018/0077099 A1 | 3/2018 | Silva et al. |
| 2018/0077166 A1 | 3/2018 | Kovega |
| 2018/0121546 A1 | 5/2018 | Dingwall et al. |
| 2018/0144110 A1 | 5/2018 | Creamer et al. |
| 2018/0152403 A1 | 5/2018 | Charignon |
| 2018/0158165 A1 | 6/2018 | Hodge |
| 2018/0188916 A1 | 7/2018 | Lyons et al. |
| 2018/0219914 A1 | 8/2018 | Reith et al. |
| 2018/0240020 A1 | 8/2018 | Madaan et al. |
| 2018/0241761 A1 | 8/2018 | Bania et al. |
| 2018/0255080 A1 | 9/2018 | Paine |
| 2018/0263545 A1 | 9/2018 | Camporesi et al. |
| 2018/0288161 A1 | 10/2018 | Saxena et al. |
| 2018/0310171 A1 | 10/2018 | Whitaker et al. |
| 2018/0349628 A1 | 12/2018 | Bender et al. |
| 2019/0121956 A1 | 4/2019 | Turgeman |
| 2019/0132344 A1 | 5/2019 | Lem et al. |
| 2019/0244212 A1 | 8/2019 | Zirnhelt |
| 2019/0295730 A1 | 9/2019 | Weldemariam et al. |
| 2019/0370854 A1 | 12/2019 | Gao et al. |

OTHER PUBLICATIONS

Guy Zyskind et al., Decentralizing Privacy: Using Blockchain to Protect Personal Data, 2015 IEEE CS Security and Privacy Workshops, pp. 180-184, http://inpluslab.sysu.edu.cn/files/Paper/Security/Decentralizing_Privacy_Using_Blockchain_To_Protect_Personal_Data.pdf.

Malek Ben Salem et al., A Survey of Insider Attack Detection Research, Insider Attack and Cyber Security: Beyond the Hacker, Springer, 2008 https://pdfs.semanticscholar.org/3135/eb4b37aa487dd5f06dfa178bbc1d874f3cdf.pdf.

Amos Azaria et al., Behavioral Analysis of Insider Threat: A Survey and Bootstrapped Prediction in Imbalanced Data, Journal of Latex Class Files, vol. 6, No. 1, Jan. 2007.

Mike Hintze et al., Comparing the Benefits of Pseudonymization and Anonymization Under the GDPR, Privacy Analytics, White Paper, 2017.

Google.com, Phishing Prevention with Password Alert FAQ, printed Feb. 22, 2018.

\* cited by examiner

USER PROFILE DEFINITION AND MANAGEMENT

BACKGROUND OF THE INVENTION

Field of the Invention

The present invention relates in general to the field of computers and similar technologies, and in particular to software utilized in this field. Still more particularly, it relates to a method, system and computer-usable medium for defining and managing a user profile.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

Another aspect of security risk is related to the mental state of a user. As an example, an ordinarily stable user may unwittingly compromise the integrity, availability of confidentiality of a normally secure asset when they are agitated or distraught. As another example, the fact that a user poses a high risk of a malicious action may be inferred by erratic behavior or abnormal mannerisms. Likewise, a normally trusted user may exhibit uncharacteristic behavior or personality traits when dealing with unfamiliar circumstances, and consequently create unintended risks for an organization.

SUMMARY OF THE INVENTION

A method, system and computer-usable medium are disclosed for defining and managing a user profile. In certain embodiments, a method, system and computer-usable medium are disclosed for performing a security analysis operation within a security environment, comprising: monitoring electronically-observable user behavior about a particular entity; maintaining a state about the particular entity, the state representing a context of a particular event; converting the electronically-observable user behavior into electronic information representing the electronically-observable user behavior; generating a user behavior profile based upon the electronic information representing the electronically-observable user behavior; and, analyzing the event using the state of the entity and the user behavior profile.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for defining and managing a user profile. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
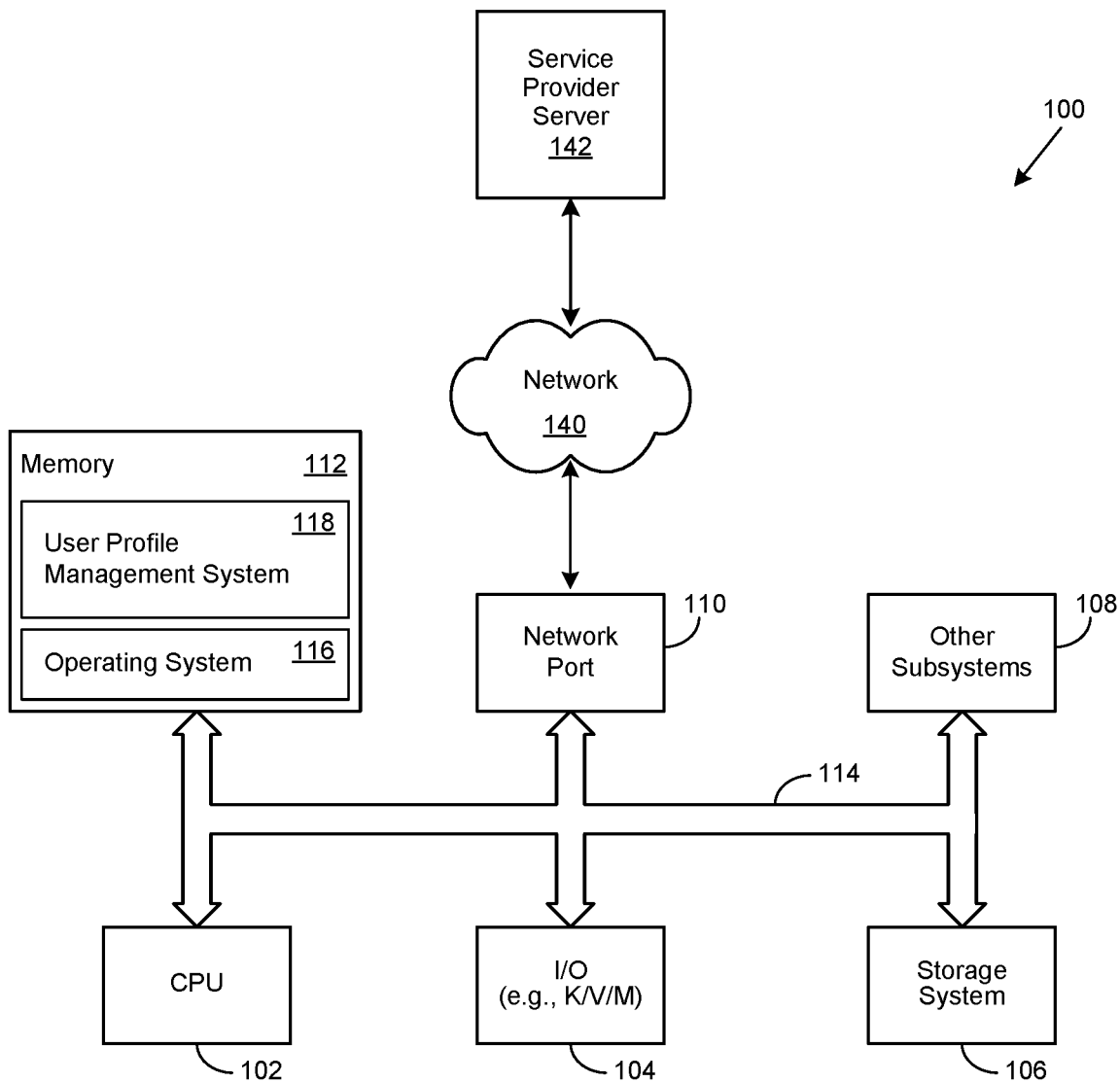
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a user profile management system 118. In one embodiment, the information handling system 100 is able to download the user profile management system 118 from the service provider server 142. In another embodiment, the user profile management system 118 is provided as a service from the service provider server 142.

In various embodiments, the user profile management system 118 performs one or more operations for defining and managing a user profile, as described in greater detail herein. In certain embodiments, the defining and managing of the user profile improves processor efficiency, and thus the efficiency of the information handling system 100, by automating the definition and management of a user profile. As will be appreciated, once the information handling system 100 is configured to define and manage a user profile, the information handling system 100 becomes a specialized computing device specifically configured to define and manage a user profile and is not a general purpose computing device. Moreover, the implementation of the user profile management system 118 on the information handling system 100 improves the functionality of the information handling system 100 and provides a useful and concrete result of defining and managing a user profile.

Figure 2:
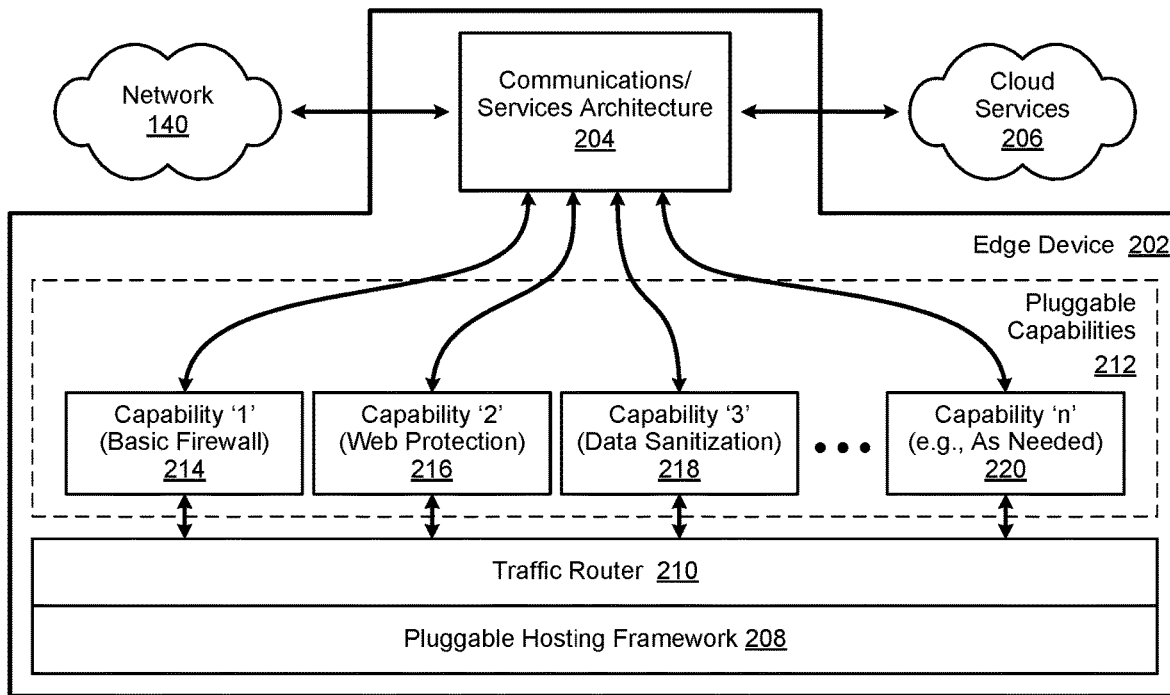
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
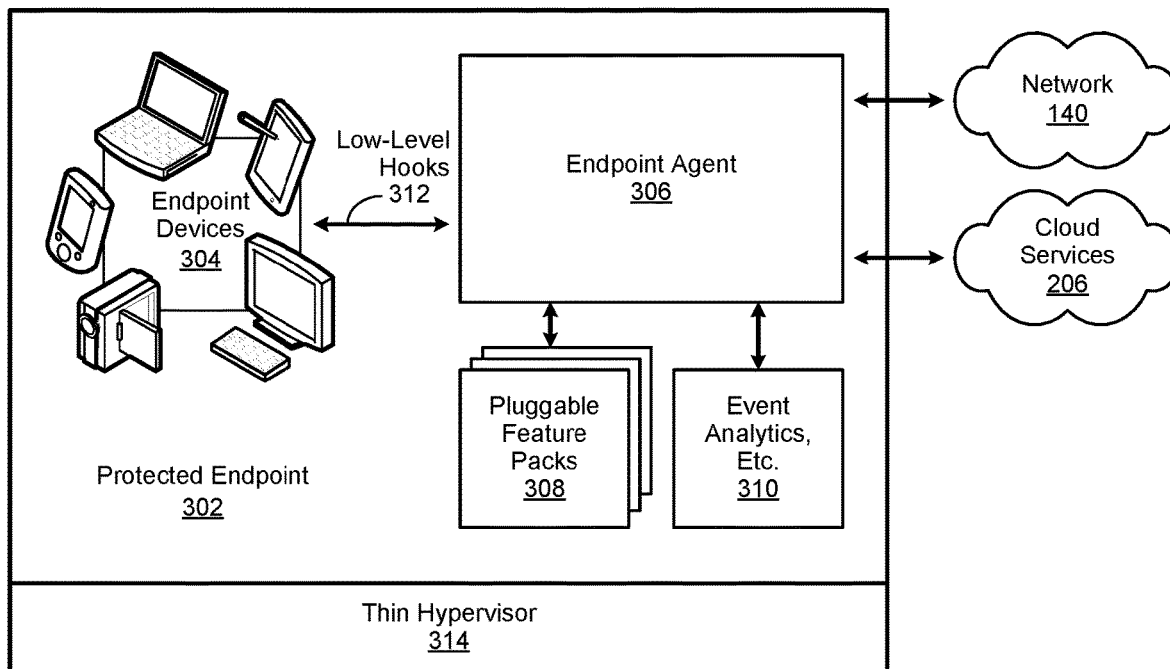
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with defining and managing a user profile, as described in greater detail herein. In certain embodiments, the protected endpoint 302 may be implemented to provide temporal information, such as timestamp information, associated with such operations.

In certain embodiments, definition and management of a user profile may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, a user's physical behavior broadly refers to any user behavior occurring within a physical realm, such as speaking, gesturing, facial patterns or expressions, walking, and so forth. More particularly, such physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors. Contextual information may likewise include various user identity resolution factors, such as personal information associated with the user, the date/time/frequency of various user behaviors, the user's location, the user's role or position in an organization, their associated access rights, and certain user gestures employed by the user in the enactment of a user behavior. In certain embodiments, personal information associated with the user, as described in greater detail herein, may include user profile attributes, user behavior factors, user mindset factors, or a combination thereof. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with defining and managing a user profile, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
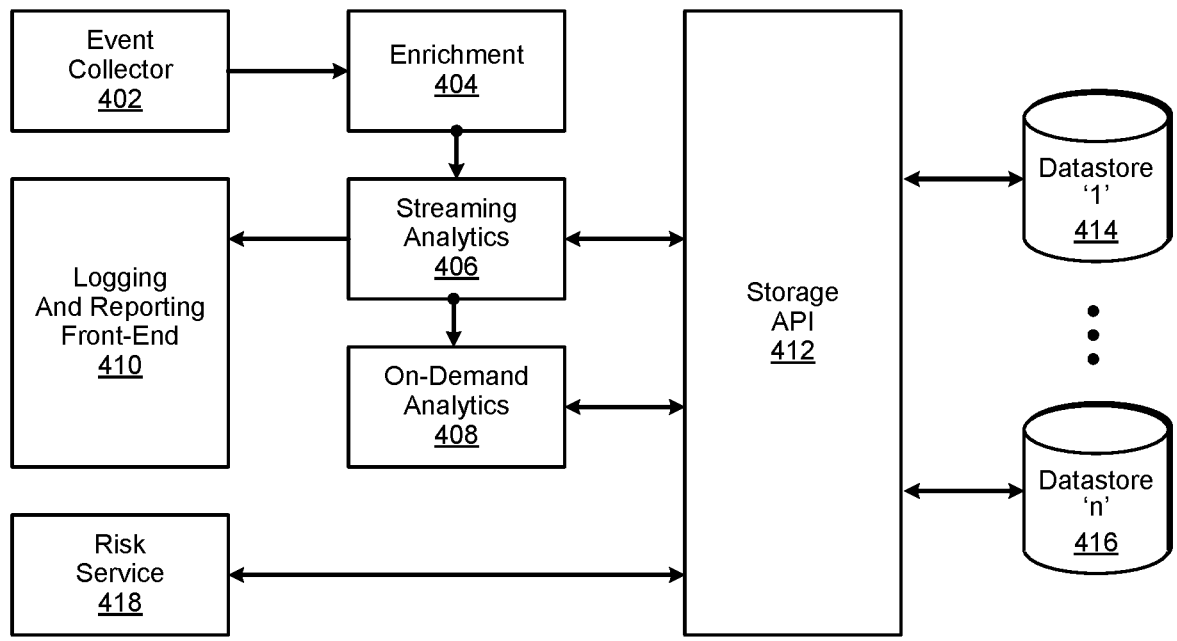
FIG. 4 is a simplified block diagram of a security analytics system.

FIG. 4 is a simplified block diagram of a security analytics system implemented in accordance with an embodiment of the invention. In certain embodiments, the security analytics system shown in FIG. 4 may be implemented to provide log storage, reporting, and analytics capable of performing streaming 406 and on-demand 408 analytics operations. In certain embodiments, such operations may be associated with defining and managing a user profile, as described in greater detail herein. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular time period or at a particular point in time, may represent suspicious user behavior.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information, described in greater detail herein, associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with defining and managing a user profile, as described in greater detail herein. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
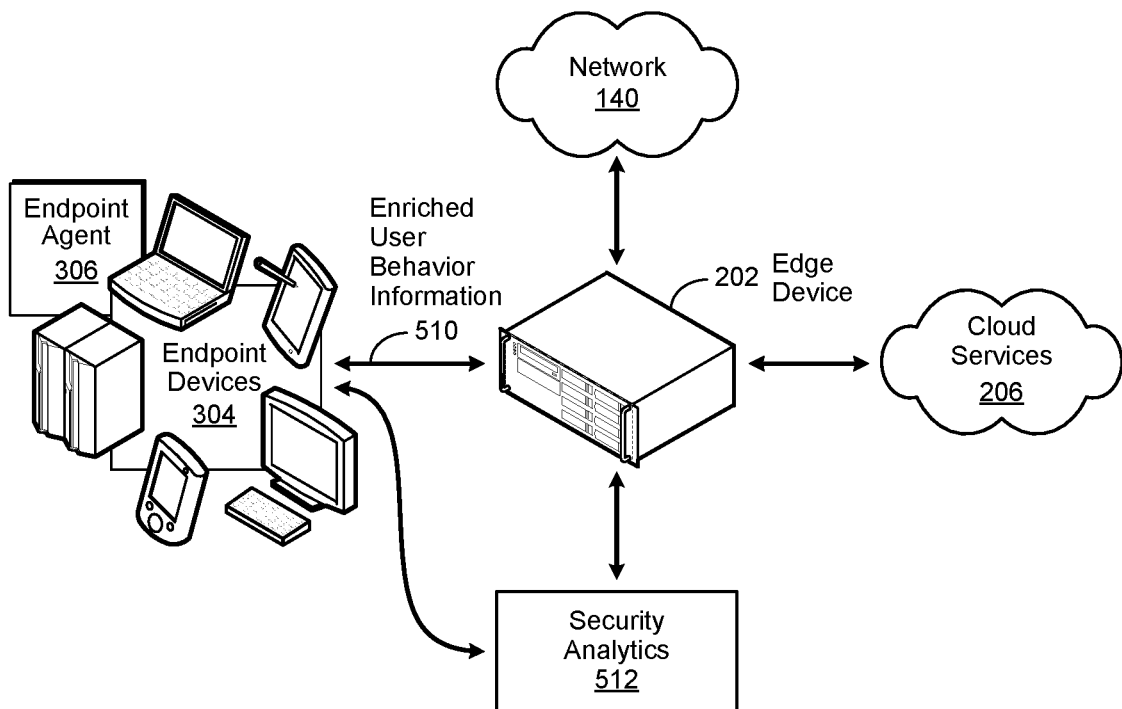
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 512 may be implemented to perform operations associated with defining and managing a user profile. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality related to operations associated with defining and managing a user profile.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with managing the use of a blockchain to access a cyberprofile or other sensitive private information (SPI).

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 512 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
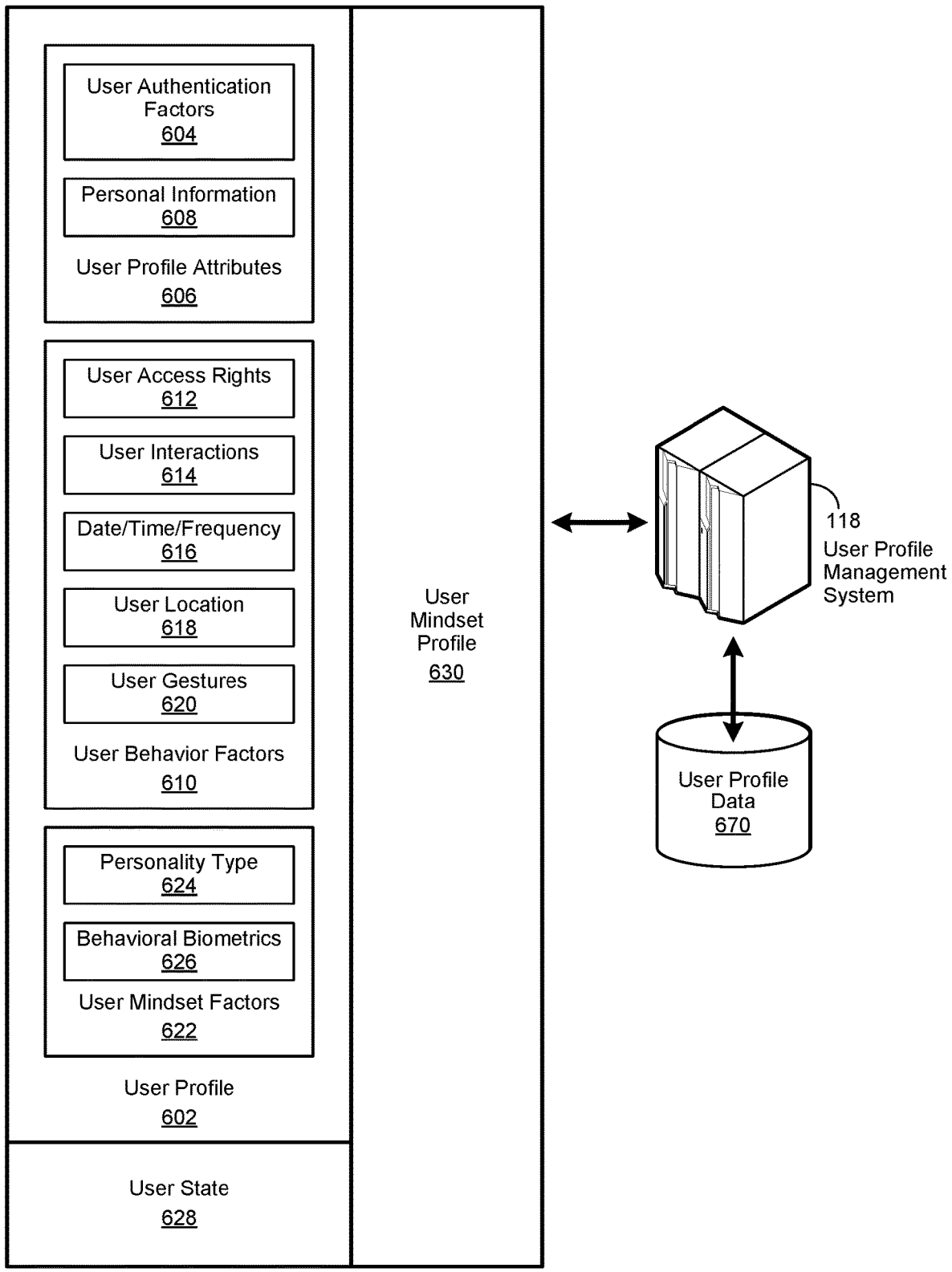
FIG. 6 is a simplified block diagram of a user profile.

FIG. 6 is a simplified block diagram of a user profile implemented in accordance with an embodiment of the invention. As used herein, a user profile 602 broadly refers to a collection of information that uniquely describes a user's identity and their associated behavior, whether the behavior occurs within a physical realm or cyberspace. In certain embodiments, as described in greater detail herein, the user profile 602 may include user profile attributes 606, user behavior factors 610, user mindset factors 622, or a combination thereof. In certain embodiments, the user profile attributes 606 may include certain user authentication factors 604, described in greater detail herein, and personal information 608.

As used herein, a user profile attribute 606 broadly refers to data or metadata that can be used, individually or in combination with other user profile attributes 606, to uniquely ascertain the identity of a user. In certain embodiments, the personal information 608 may include non-sensitive personal information associated with a user, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information 610 associated with a user. As used herein, sensitive personal information (SPI), also commonly referred to as personally identifiable information (PII), broadly refers to any information usable to ascertain the identity of a user, either by itself, or in combination with other information, such as contextual information described in greater detail herein.

Examples of SPI may include the full or legal name of a user, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 610 broadly refers to information associated with a user's behavior, whether the behavior occurs within a physical realm or cyberspace. In certain embodiments, user behavior factors 610 may include the user's access rights 612, the user's interactions 614, and the date/time/frequency 616 of when the interactions 614 are enacted. In certain embodiments, the user behavior factors 610 may likewise include the user's location 618, and the gestures 620 used to enact the interactions 614.

In certain embodiments, the user gestures 620 may include key strokes on a keypad, a cursor movement, a mouse movement or click, a finger swipe, tap, or other hand gesture, an eye movement, or some combination thereof. In certain embodiments, the user gestures 620 may likewise include the cadence of the user's keystrokes, the motion, force and duration of a hand or finger gesture, the rapidity and direction of various eye movements, or some combination thereof. In certain embodiments, the user gestures 620 may include various audio or verbal commands performed by the user.

As used herein, mindset factors 622 broadly refer to information used to determine the mental state of a user at a particular point in time, during the occurrence of an event or an enactment of a user behavior, or combination thereof. As used herein, mental state broadly refers to a hypothetical state corresponding to the way a user may be thinking or feeling. In certain embodiments, the user mindset factors 622 may include a personality type 624. Examples of known approaches for determining a personality type 624 include Jungian types, Myers-Briggs type indicators, Keirsy Temperament Sorter, Socionics, Enneagram of Personality, and Eyseneck's three-factor model.

In certain embodiments, the mindset factors 622 may include various behavioral biometrics 626. As likewise used herein, a behavioral biometric 626 broadly refers to a physiological indication of a user's mental state. Examples of behavioral biometrics 626 may include a user's blood pressure, heartrate, respiratory rate, eye movements and iris dilation, facial expressions, body language, tone and pitch of voice, speech patterns, and so forth.

Certain embodiments of the invention reflect an appreciation that certain user behavior factors 610, such as user gestures 620, may provide additional information related to determining a user's mental state. As an example, a user entering text at a quick pace with a rhythmic cadence may indicate intense focus. Likewise a user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user gestures 620 may indicate the mental state of a user, they may not provide the reason for the user to be in a particular mental state. Likewise, certain embodiments of the invention include an appreciation that certain user gestures 620 and behavioral biometrics 626 are reflective of a user's personality type 624. As an example, aggressive, forceful keystrokes combined with an increased heart rate may indicate normal behavior for a particular user when composing end-of-month performance reviews. In various embodiments, certain user behavior factors 610, such as user gestures 620, may be correlated with certain contextual information, as described in greater detail herein.

In certain embodiments, a user profile management system 118 may be implemented to use a user profile 602 in combination with a user state 628 to generate a user mindset profile 630. As used herein, user state 628 broadly refers to the context of a particular event or user behavior. As an example, a user may have a primary work location, such as their company's headquarters, and a secondary work location, such as their home office.

In this example, the user's primary and secondary offices respectively correspond to a user location 618 user behavior factor 610, whereas the presence of the user at either office corresponds to a user state 628. To continue the example, the user may consistently work at their primary office Monday through Thursday, but at their home office on Fridays. Accordingly, a date/time/frequency 616 user behavior factor 610 can likewise be associated with user behavior respectively enacted on those days, regardless of their corresponding locations. Consequently, the user state 628 on Monday through Thursday will typically be "working at the headquarters office" and the user state 628 on Friday will likely be "working at the home office."

As likewise used herein, a user mindset profile 630 broadly refers to a collection of information that reflects an inferred mental state of a user at a particular time during the occurrence of an event or an enactment of a user behavior. As an example, certain information may be observed such as a user spending an increasing amount of time on job recruiting websites which would facilitate an inference that the user has an increased probability of leaving the company. Similarly, increasingly erratic spending on a corporate card may be observed which would facilitate an inference that the user has a negative sentiment toward the company or some other stressor driving this change in behavior. Likewise, it may be possible to observe a user's associated user behavior factors 610, such as their interactions with various systems, when they log-in and log-out, when they are active at the keyboard, the rhythm of their keystrokes, and which files they typically use.

It will be appreciated that these user behaviors are be likened to a fingerprint, unique to every individual. However, unlike a fingerprint, these user behavior factors 610 also change, a little or a lot, from day to day. These changes may be benign, such as when a user begins a new project and accesses new data, or they may indicate something more concerning, such as a user who is actively preparing to steal data from their employer.

Accordingly, these observed user behaviors can be used to build a user profile for a particular user or other entity. In addition to creating a model of a user's various attributes and observed behaviors, these observations can likewise be used to infer things that are not necessarily explicit. As an example, a user may be observed eating a meal, which may or may not indicate the user is hungry. However, if it is also known that the user worked at their desk throughout lunchtime and is now eating a snack during a mid-afternoon break, then it can be inferred they are indeed hungry.

In certain embodiments, as described in greater detail herein, the user profile management system 118 may be implemented to use a user profile 602 in combination with an associated user state 628 and user mindset profile 630 to infer a user's intent. In certain embodiments, the user profile management system 118 may be implemented to use various data stored in a repository of user profile data 670 to perform such an inference. In certain embodiments, the repository of user profile data 670 may include various user profiles 602, user state 628 data, user mindset profiles 630, and associated contextual information, described in greater detail herein.

To continue the prior example, the user may typically work out of their home office on Fridays. Furthermore, various mindset factors 622 within their associated user profile 602 indicate that the user is typically relaxed and methodical when working with customer data. Moreover, the user's user profile 602 indicates that such interactions 614 with customer data typically occur on Monday mornings and the user rarely, if ever, copies or downloads customer data. However, the user may decide to interact with certain customer data late at night, on a Friday, while in their headquarters office. As they do so, they exhibit an increased heartrate, rapid breathing, and furtive keystrokes while downloading a subset of customer data to a flash drive.

Consequently, their user mindset profile 630 may reflect a guilty mindset, which is inconsistent with the user state 628 of dealing with customer data in general. More particularly, downloading customer data late at night on a day the user is generally not in their primary office results in a user state 628 that is likewise inconsistent with the user's typical user behavior. As a result, the user profile management system 118 may infer that the user's behavior may represent a security threat. Those of skill in the art will recognize that many such embodiments and examples are possible. Accordingly, the foregoing is not intended to limit the spirit, scope or intent of the invention.

Figure 7:
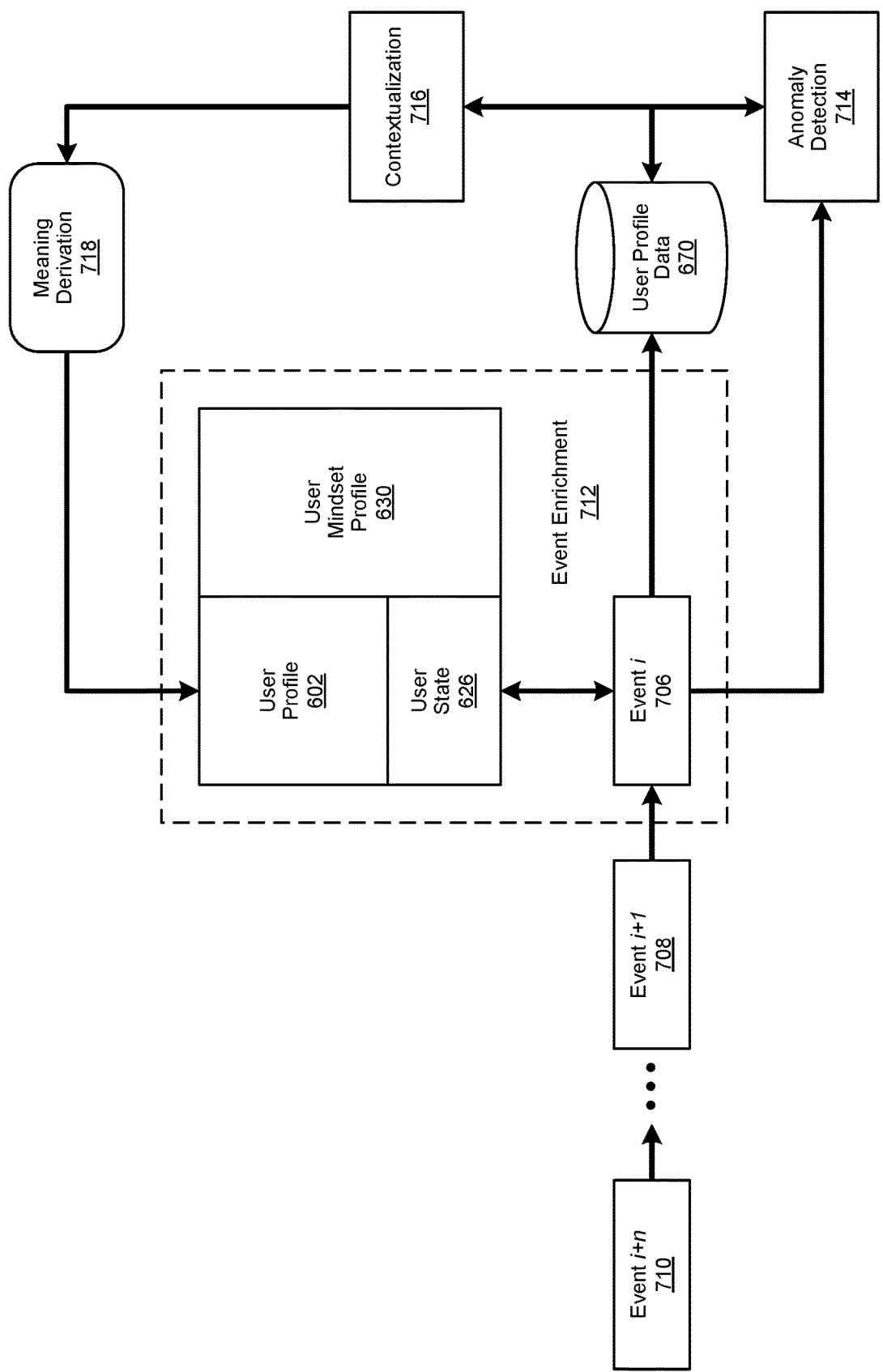
FIG. 7 is simplified block diagram of process flows associated with the operation of a user profile management system.

FIG. 7 is simplified block diagram of process flows associated with the operation of a user profile management system implemented in accordance with an embodiment of the invention. In certain embodiments, a user profile management system may be implemented to define and manage a user profile 602, described in greater detail herein. In certain embodiments, the user profile management system may be implemented use the resulting user profile 602 in combination with a particular user state 626 to generate a user mindset profile 630, likewise described in greater detail herein. In certain embodiments, the user profile management system may be implemented to use the resulting user mindset profile 630 in combination with an associated user profile 602 and user state 626 to detect anomalous, abnormal or malicious user behavior.

As used herein, an event broadly refers to the occurrence of action performed by an entity. As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint and edge devices, a network, a domain, an operation, or a process. In certain embodiments, an entity may be a resource, such as a geographical location or formation, a physical facility, a venue, a system, a data store, or a service, such as a service operating in a cloud environment.

In certain embodiments, the user profile management system may be implemented to process certain entity information associated with defining and managing a user profile. As used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the user profile management system may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the user profile management system may be implemented to use information associated with such temporal resolution of an entity's identity to assess the risk associated with a particular entity, at a particular point in time, and adaptively respond with an associated response. In certain embodiments, the user profile management system may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the user profile management system may be more oriented in various embodiments to risk adaptation than to security administration.

In certain embodiments, user profile definition and management operations are begun with the receipt of information associated with event i 706. In certain embodiments, information associated with an initial event i 706 may include user profile attributes, user behavior factors, user mindset factors, user state information, contextual information, described in greater detail herein, or a combination thereof. In various embodiments, certain user profile 602, user state 626, and user mindset profile 630 data stored in a repository of user profile data 670 may be retrieved and then used to perform event enrichment 712 operations to enrich the information associated with event i 706. Anomaly detection 714 operations are then performed on the resulting enriched information associated with event i 706 to determine whether it is anomalous.

In various embodiments, certain contextualization information stored in the repository of user profile data 670 may be retrieved and then used to perform contextualization 716 operations to provide context, based upon the entity's user profile 602 and its associated user state 626. In certain embodiments, meaning derivation 718 operations are then performed on the contextualized information associated with event i 706 to derive meaning. In certain embodiments, the derivation of meaning may include inferring the intent of an entity associated with event i 706. In certain embodiments, the resulting information associated with event i 706 is then used to update the user profile 602 corresponding to the entity associated with event i 706. In certain embodiments, the process is iteratively repeated, proceeding with information associated with event i+1 708 through event i+n 710.

From the foregoing, skilled practitioners of the art will recognize that a user profile 602, as implemented in certain embodiments, not only allows the identification of events that are anomalous for a particular user, but also provides higher-level data that allows for the contextualization of observed events. Accordingly, by viewing individual sets of events both in context and with a view to how unexpected they may bee, it is possible to achieve a more nuanced and higher-level comprehension of a user's intent.

Figure 8:
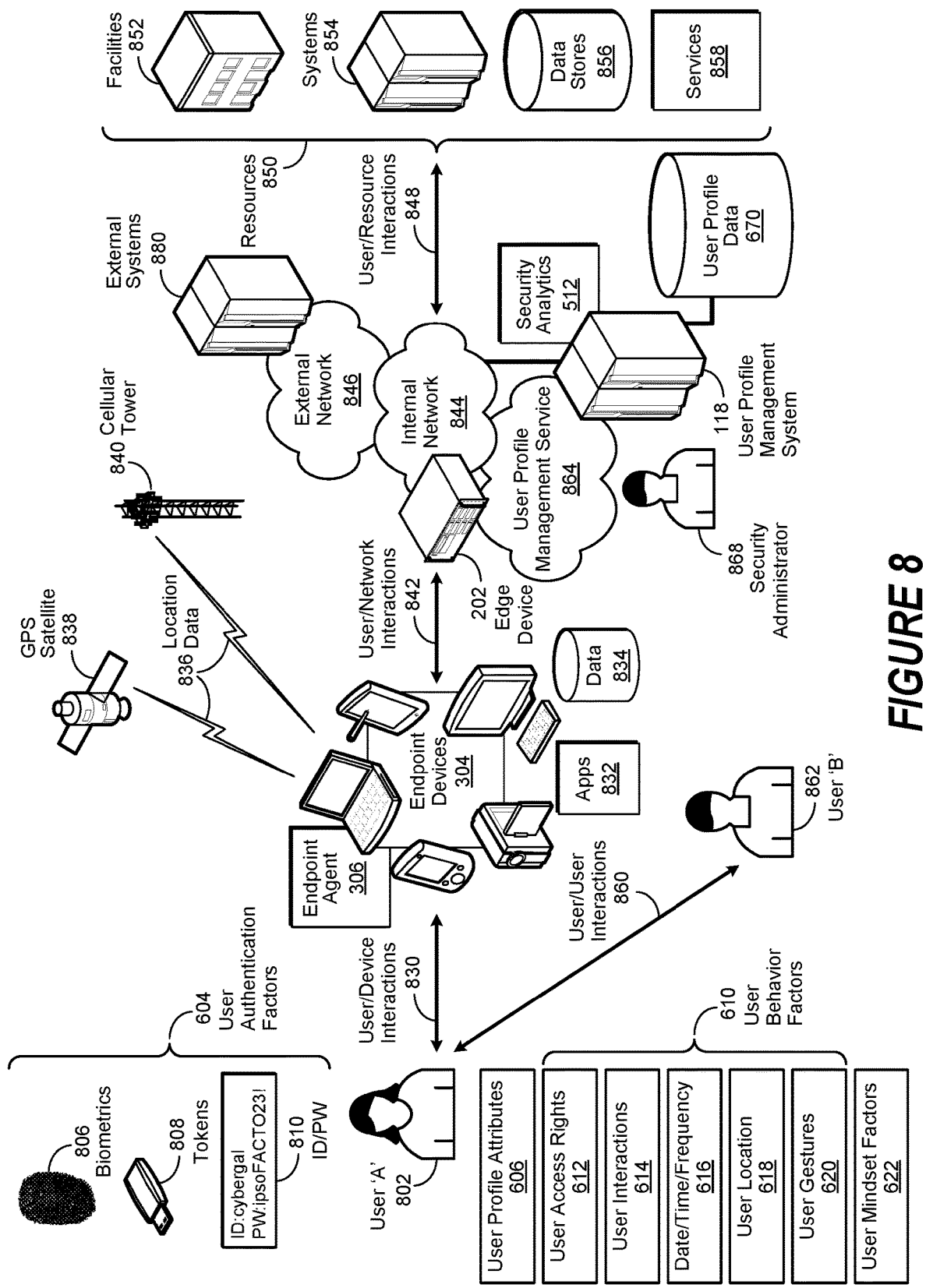
FIG. 8 is a simplified block diagram of the operation of a user profile management system.

FIG. 8 is a simplified block diagram of the operation of a user profile management system implemented in accordance with an embodiment of the invention. In certain embodiments, the user profile management system 118 may be implemented to define and manage a user profile. In certain embodiments, a user profile, is associated with a user, such as user 'A' 802 or 'B' 862. In certain embodiments, as described in greater detail herein, the user profile is used to identify anomalous, abnormal or malicious behavior associated with a user at a particular point in time, during the occurrence of an event, the enactment of a user behavior, or a combination thereof. In certain embodiments, as likewise described in greater detail herein, the user profile may include user profile attributes 606, user behavior factors 610, and user mindset factors 622.

In certain embodiments, the user profile attributes 606 may include certain user authentication factors 604. In certain embodiments, the user authentication factors 604 are used to authenticate the identity of a user, such as user 'A' 802 or 'B' 862. In certain embodiments, the user authentication factors 604 are used to ensure that a particular user, such as user 'A' 802 or 'B' 862, is associated with their corresponding user profile, rather than a user profile associated with another user. In certain embodiments, the user authentication factors 604 may include a user's biometrics 806, an associated security token 808, (e.g., a dongle containing cryptographic keys), or a user identifier/password (ID/PW) 810.

In certain embodiments, the user authentication factors 604 may be used in combination to perform multi-factor authentication of a user, such as user 'A' 802 or 'B' 862. As used herein, multi-factor authentication broadly refers to approaches requiring two or more authentication factors. In general, multi-factor authentication includes three classes of user authentication factors 604. The first is something the user knows, such as a user ID/PW 810. The second is something the user possesses, such as a security token 808. The third is something that is inherent to the user, such as a biometric 806.

In certain embodiments, multi-factor authentication may be extended to include a fourth class of factors, which includes one or more user behavior factors 610, or portions thereof. In these embodiments, the fourth class of factors may include user behavior the user has previously enacted, is currently enacting, or is expected to enact at some point in the future. In certain embodiments, multi-factor authentication may be performed on recurring basis. In various embodiments, the multi-factor authentication may be performed at certain time intervals during the enactment of a particular user behavior. In certain embodiments, the time interval may be uniform. In certain embodiments, the time interval may vary or be random.

In certain embodiments, the multi-factor authentication may be performed according to the occurrence of an event or the enactment of a particular user behavior, such as accessing a resource 850. In various embodiments, certain combinations of the enhanced multi-factor authentication described herein may be used according to the enactment of a particular user behavior. From the foregoing, those of skill in the art will recognize that the addition of such a fourth class of factors not only strengthens current multi-factor authentication approaches, but further, allows the factors to be more uniquely associated with a given user and their corresponding user profile.

Those of skill in the art will be aware that it is not uncommon for hackers, criminals and other actors to use various sensitive personal information (SPI), described in greater detail herein, to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as an external system 880. Defenses against such approaches include encrypting the data stream prior to its communication across a network, such as the internal 844 or external 846 networks shown in FIG. 8.

However, other approaches, such as the use of a key logger, may surreptitiously capture the user's keystrokes or user gestures 620 and communicate the resulting data stream in their native form to a hacker or other infiltrator. Another issue is the possibility that a normally-trusted insider, such as a security administrator 868, may have access to a decrypted data stream as part of their day-to-day responsibilities. As an example, a security administrator 868 may be using a security analytics 512 system to perform threat analysis related to a particular user. In the process, they may be exposed to various SPI associated with the user, such as certain user IDs and passwords 810. It will be appreciated that such exposure creates the opportunity for a security breach, whether intended or not. Another approach is to impersonate a legitimate website. In such approaches, the user may navigate to the site and innocently enter their ID/password 810, only to have them captured for later use in illegal activities.

In various embodiments, certain date/time/frequency 616 behavior factors 608 may be implemented as ontological or societal time, or a combination thereof. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted as well as a precise temporal distance between the user behaviors.

As likewise used herein, societal time broadly refers to the correlation of certain user profile attributes 606, user behavior factors 608, user mindset factors 610, or a combination thereof, to one or more instants in time. As an example, user 'A' 802 may access a system 854 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 862 at 3:49 PM that same day. Furthermore, there is no record in their user behavior profile that user 'A' 802 has ever communicated with user 'B' 862 in the past. Moreover, it may be determined that user 'B' 862 is employed by a competitor. Accordingly, the correlation of user 'A' 802 downloading the customer list at one point in time, and then forwarding the customer list to user 'B' 862 at a second point in time shortly thereafter, is an example of societal time.

In a variation of the prior example, user 'A' 802 may download the customer list at 3:47 PM on Nov. 3, 2017. However, instead of immediately forwarding the customer list to user 'B' 862, user 'A' 802 leaves for a two week vacation. Upon their return, they forward the previously-downloaded customer list to user 'B' 862 at 9:14 AM on Nov. 20, 2017. From an ontological time perspective, it has been two weeks since user 'A' 802 accessed a system 854 to download the customer list. However, from a societal time perspective, they have still forwarded the customer list to user 'B' 862, despite two weeks having elapsed since the customer list was originally downloaded. Accordingly, the temporal distance between the two events is much smaller than it would appear as the user has been absent for most of the actual two weeks that passed.

Accordingly, the strong correlation of user 'A' 802 downloading the customer list at one point in time, and then forwarding the customer list to user 'B' 862 at a much later point in ontological time, is another example of the value of examining events societal time. More particularly, it may be inferred that the intent of user 'A' 802 did not change during the two weeks they were on vacation. Furthermore, user 'A' 802 may have attempted to mask an intended malicious act by letting some period of time elapse between the time they originally downloaded the customer list and when they eventually forwarded it to user 'B' 862.

In certain embodiments, a security system may be implemented to decay the risk associated with a user according to the amount of ontological time that has lapsed since their last observed policy violation. To continue the example, a first user may have committed a policy violation two work weeks earlier. However, nothing in their user behavior since has indicated any further anomalous or abnormal activity, despite interacting with various systems and resources on a daily basis. Accordingly, the security system gradually lowers the risk associated with the first user over the two week period. In contrast, the second user may commit the same policy violation just before leaving for a two week vacation, during which they have no interaction with the systems and resources they typically use.

From the perspective of ontological time, the two work weeks and the two week vacation are equivalent. Consequently, the system may assess the same level of risk for both the first and second user. However, from the perspective of societal time, the risk associated with the policy violation occurring just before second user left for a two week vacation may in fact be higher than the risk associated with first user, who committed the same policy violation two work weeks earlier. From the foregoing, those of skill in the art will recognize that the use of societal time may be advantageous in determining whether a particular user behavior is acceptable, anomalous or malicious.

In certain embodiments, the resulting user profiles may be processed with associated contextual information to generate correlated contextual information. In certain embodiments, the correlated contextual information may be stored in a repository of user profile data 670. In certain embodiments, the correlated contextual information, along with a user's user profile, may be used to perform certain user behavior analysis. In certain embodiments, the user behavior analysis may be performed by the security analytics system 512.

In certain embodiments, the security analytics system 512 may be implemented to process a user profile and certain correlated contextual information associated with a user to determine their mental state at a particular point in time. In certain embodiments, the mental state of a user at a particular point in time may be used in combination with various user profile attributes 606 and user behavior factors 622, in the context of an associated user state, to infer a user's intent. In certain embodiments, the user's intent, as it relates to an associated user state, is stored in a user mindset profile, described in greater detail herein.

In certain embodiments, the user profile may be used with a first set of contextual information to determine the user's mental state at a first point in time and a second set of contextual information to determine their mental state at a second point in time. In certain embodiments, the user's mental state at a first point in time may correspond to the occurrence of a first user event and the user's mental state at a second point in time may correspond to the occurrence of a second user event. Certain embodiments of the invention reflect an appreciation that such a first and second set of contextual information may be decidedly different, which may provide context for the user's mental state at different times and during the occurrence of different user events. Likewise, the first and second set of contextual information may be substantively the same, which may provide an indication that while the user's mental state may be different at two points in time, or during the occurrence of two different user events, the cause of their mental state may not be related to the contextual information that was collected at the two points in time.

It will be appreciated that over time, the user behavior of a particular user, such as user 'A' 802, will be uniquely different and distinct from another user, such as user 'B' 862. Accordingly, user profile '1' will uniquely reflect the user behavior of user '1', just as user profile 'n' will uniquely reflect the user behavior of user 'n'. As an example, user 'A' 802 may have a user profile attribute 606 of sales administrator. Upon arriving at their office in the morning, the user consistently checks their email, item by item, responding to each in turn, followed by processing expense reports for field sales personnel. Then, after lunch, the user may access and review sales forecasts on an internal system 854. Furthermore, the user may exhibit sporadic keyboard entry interspersed with extensive mouse activity, or user gestures 620, when perusing the sales forecasts.

Moreover, personality type information associated with user 'A' 802 may indicate the user consistently exhibits a positive, outgoing attitude. In this example, the sequence of the activities enacted by user 'A' 802 throughout the day, and their frequency, correspond to their expected date/time/frequency 616 user behavior factors 608. Likewise, the keyboard cadence and other user gestures 620 are examples of granular user behavior factors 608, while the personality type information is an example of an abstract user behavior factor 608.

As another example, user 'B' 862 may have a user profile attribute 606 of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 854. Additionally, user 'B' 862 may exhibit deliberate keyboard entry interspersed with iterative mouse activity, or user gestures 620, when updating financial information. Moreover, personality type information associated with user 'B' 862 may indicate they consistently exhibit a reserved, introspective and contemplative attitude. As in the prior example, the sequence of the activities enacted by user 'B' 862 throughout the day, and their frequency, correspond to their expected date/time/frequency 616 user behavior factors 608. Likewise, as before, the keyboard cadence and other user gestures 624 are examples of granular user behavior factors 608, while the personality type information is an example of an abstract user behavior factor 608.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 850 in the first month in the position, but by the sixth month, such access and interaction is commonplace and routine.

In certain embodiments, a user profile may be implemented as a multi-faceted user profile, where each facet corresponds to a particular user authentication factor 604, user profile attribute 606, user behavior factors 610, or user mindset factors 622. As an example, one facet of a multi-faceted user profile may correspond to the use of a particular biometric 806 user authentication factor 604, while another facet may correspond to a user's access rights 612 to a particular system 854. In certain embodiments, a multi-faceted user profile may be further implemented as a multi-dimensional user profile, where each user authentication 604 factor, user profile attribute 606, user behavior factors 610, or user mindset factors 622 associated with a facet may have a corresponding degree of dimensional detail.

As an example, a biometric 806 user authentication factor 604 associated with a retinal scan may simply have the dimension of "match" or "not match," which provides a low degree of dimensional detail. Conversely, its associated dimension information may include actual retinal pattern correlation scores, which provides a higher degree of dimensional detail. As yet another example, a user gesture 620 user behavior factor 610, such as keyboard cadence, may simply indicate whether the user's keyboard usage is within an acceptable range of rhythm and speed metrics, which provides a low degree of dimensional detail. In contrast, its associated dimensional information may include key logger information related to which keys were struck, in which order, at which point in time, which provides a higher degree of dimensional detail.

As yet another example, a date/time/frequency 616 user behavior factor 608, such as when a particular file is accessed, may simply indicate which date the file was accessed, but not the exact time or how often. Alternatively, its associated dimensional information may include exact times the file was accessed, which by extension may indicated how frequent or infrequently the file was accessed during a particular temporal interval. In this example, the lack of the exact time or how often the file was accessed provides a low degree of dimensional detail. Conversely, its provision provides a high degree of dimensional detail, which may prove advantageous when assessing risk associated with the user accessing the file.

In various embodiments, a user profile may be implemented as a multi-layered user behavior profile, where each layer corresponds to a certain level of detail corresponding to a particular user authentication factor 604, user behavior factor 610, or user mindset factor 622. In certain embodiments, the level of detail may correspond to a particular level of temporal detail corresponding to a particular user authentication factor 604, user profile attribute 606, user behavior factor 610, or user mindset factor 622. As an example, one temporal detail layer of a multi-layered user behavior profile may correspond to various user interaction 614 user behavior factors 610, described in greater detail herein, over a 30 day period. In this example, the various user interactions 614 enacted during the-30 day period may be abstracted to simply represent which user/device 830, user/network 842, user/resource 848, and user/user 860 interactions took place, with their corresponding frequency. Alternatively, another temporal detail layer may provide the date/time/frequency 616 of each user interaction 614, not just during the 30 day period, but each 24 hour period therein. It will be appreciated that such a temporal level of detail related to such interactions may provide useful trend information, which in turn can be used advantageously when assessing security risk.

In certain embodiments, a user behavior factor 610 associated with a particular user, such as user 'A' 802 or 'B' 862, may be used by the user profile management system 118 to compare the user's current user behavior to past user behavior. If the user's current user behavior matches their past user behavior, then the user profile management system 118 may determine that the user's user behavior is acceptable. If not, then the user profile management system 118 may determine that the user's user behavior is anomalous or malicious.

However, as described in greater detail herein, a change in a particular user's user behavior over time may not be anomalous, malicious or anomalous but not dangerous. Instead, it may be acceptable behavior that simply evolves over time as a natural result of day-to-day user/device 830, user/network 842, user/resource 848, or user/user 860 interactions. In certain embodiments, the user profile management system 118 may be implemented to determine whether such changes in a user's user behavior over time are acceptable, anomalous, or malicious. In certain embodiments, a multi-layered user behavior profile may be implemented in combination with the user profile management system 118 to make this temporal determination. In certain embodiments, a multi-faceted or multi-dimensional user behavior profile may likewise be implemented in combination with a multi-layer user behavior profile and the user profile management system 118 to make such determinations.

In certain embodiments, a user profile may be implemented in combination with a user mindset profile, described in greater detail herein, to make such determinations. In certain embodiments, a user profile may be implemented in combination with a user mindset profile to make such determinations in the context of the occurrence of a user event, likewise described in greater detail herein. In these embodiments, the method by which the multi-faceted, multi-dimensional, multi-layered user profile, and user mindset profile is implemented, individually or in combination, with the user profile management system 118 is a matter of design choice.

It will be appreciated that anomalous user behavior may include inadvertent or compromised user behavior. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous as the attempt did not occur during the week, from the user's place of employment, during normal work hours. However, the user behavior may manifest in context with consistent remote access patterns and provide sufficient evidence to determine the nature of the activity.

Likewise, the user profile management system 118 may determine that the user's user behavior to be malicious. As yet another example, an impostor may be attempting to pose as a legitimate user in an attempt to exploit one or more resources 850. In this example, the attempt to exploit one or more resources 850 is malicious user behavior. As yet still another example, a legitimate user may be attempting to increase their level of access to one or more resources 850. In this example, the user's attempt to increase their level of access may indicate malicious user behavior.

To further extend these examples, such resources 850 may include various facilities 852, systems 854, data stores 856, or services 858. In certain embodiments, the user profile management system 118 may be implemented to block a user if it is determined their user behavior is anomalous or malicious. In certain embodiments, the user profile management system 118 may be implemented to modify a request submitted by a user if it is determined the request is anomalous or malicious. In certain embodiments, the user profile management system 118 may be implemented to modify an outcome. For example, the user profile management system 118 may encrypt a file when a copy operation or request is detected.

In certain embodiments, the user profile may be implemented as a cyberprofile. A cyberprofile, as used herein, broadly refers to a collection of information that uniquely describes an entity and their associated behavior within cyberspace.

In certain embodiments, the user profile management system 118 may be implemented to use information associated with certain user behavior elements to define and manage a user profile. A user behavior element, as used herein, broadly refers to a discrete element of a user's behavior during the performance of a particular operation, or the occurrence of a particular event, in a physical realm, cyberspace, or a combination thereof. In certain embodiments, such user behavior elements may be associated with a user/device 830, a user/network 842, a user/resource 848, a user/user 860 interaction, or combination thereof.

As an example, user 'A' 802 may use an endpoint device 304 to browse a particular web page on a news site on the Internet. In this example, the individual actions performed by user 'A' 802 to access the web page are user behavior elements that constitute a user behavior. As another example, user 'A' 802 may use an endpoint device 304 to download a data file from a particular system 854. In this example, the individual actions performed by user 'A' 802 to download the data file, including the use of one or more user authentication factors 804 for user authentication, are user behavior elements that constitute a user behavior. In certain embodiments, the user/device 830 interactions may include an interaction between a user, such as user 'A' 802 or 'B' 862, and an endpoint device 304.

In certain embodiments, the user/device 830 interaction may include interaction with an endpoint device 304 that is not connected to a network at the time the interaction occurs. As an example, user 'A' 802 or 'B' 862 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 848 interactions may include interactions with various resources 850. In certain embodiments, the resources 850 may include various facilities 852 and systems 854, either of which may be physical or virtual, as well as data stores 856 and services 858. In certain embodiments, the user/user 860 interactions may include interactions between two or more users, such as user 'A' 802 and 'B' 862. In certain embodiments, the user/user interactions 860 may be physical, such as a face-to-face meeting, via a user/device 830 interaction, a user/network 842 interaction, a user/resource 848 interaction, or some combination thereof.

In certain embodiments, the user/user 860 interaction may include a face-to-face verbal exchange between two users. In certain embodiments, the user/user 860 interaction may include a written exchange, such as text written on a sheet of paper, between two users. In certain embodiments, the user/user 860 interaction may include a face-to-face exchange of gestures, such as a sign language exchange, between two users. In certain embodiments, temporal event information associated with various interactions 830, 842, 848, 860 may be collected and used to define and manage a user profile.

In certain embodiments, the user profile management system 118 may be implemented to observe user behavior at one or more points of observation within a physical domain or cyberspace environment. In certain embodiments, the points of observation may occur during various user interactions, such as user/device 830, user/network 842, user/resource 848, and user/user 860 interactions described in greater detail herein. As an example, a user/user 860 interaction may include an interaction between user 'A' 802 and '13' 862.

In certain embodiments, the point of observation may include cyber behavior of various kinds within an internal 844 network. As an example, the cyber behavior within an internal 844 network may include a user accessing a particular internal system 854 or data store 856. In certain embodiments, the point of observation may include cyber behavior of various kinds within an external 846 network. As an example, the cyber behavior within an external 846 network may include a user's social media activities or participation in certain user forums. Those of skill in the art will recognize that many such examples of user/device 830, user/network 842, user/resource 848, and user/user 860 interactions are possible. Accordingly, the foregoing is not intended to limit the spirit, scope or intent of the invention.

In certain embodiments, the user profile management system 118 may be implemented to process certain contextual information to ascertain the identity of an entity at a particular point in time. In certain embodiments, the contextual information may include location data 836. In certain embodiments, the endpoint device 304 may be configured to receive such location data 836, which is used as a data source for determining the user's location 622.

In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 836 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 852 or system 854. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the user profile management system 118 may be implemented as a stand-alone system. In certain embodiments, the user profile management system 118 may be implemented as a distributed system. In certain embodiment, the user profile management system 118 may be implemented as a virtual system, such as an instantiation of one or more virtual machines (VMs). In certain embodiments, the user profile management system 118 may be implemented as a user profile management service 864. In certain embodiments, the user profile management service 864 may be implemented in a cloud environment familiar to those of skill in the art. Those of skill in the art will recognize that many such embodiments are possible. Accordingly, the foregoing is not intended to limit the spirit, scope or intent of the invention.

In certain embodiments, user profile definition and management operations are initiated by ongoing operations being performed to monitor user behavior for anomalous events, such as a data breach. If an anomalous event is detected, then threat analysis operations are performed to determine whether the anomalous event represents a threat. If so, then cyberprofile elements associated with the affected cyberprofile are identified in a repository of user profile data 670.

Figure 9:
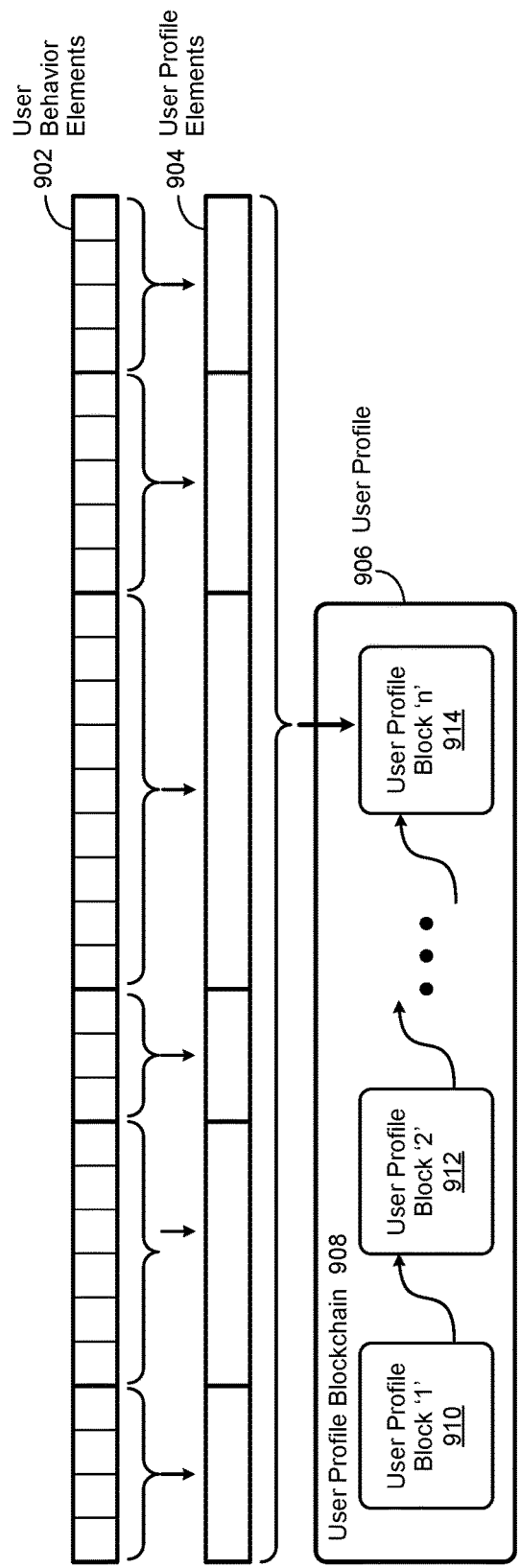
FIG. 9 is a simplified block diagram of a user profile implemented as a blockchain.

FIG. 9 is a simplified block diagram of a user profile implemented in accordance with an embodiment of the invention as a blockchain. As used herein, a blockchain broadly refers to a data structure that is tamper-evident and appendable. In certain embodiments, a blockchain may further refer to a decentralized, distributed data structure whose contents are replicated across a number of systems. These contents are stored in a chain of fixed structures commonly referred to as "blocks," such as user profile blocks '1' 910, '2' 912, and so forth, through 'n' 914. Each of these blocks typically contains certain information about itself, such as a unique identifier, a reference to its previous block, and a hash value generated from the data it contains. As an example, user profile block '2' 912 would contain a reference to user profile block '1 910, yet their respective hashes values would be different as they contain different data.

Those of skill in the art will be aware that blockchains may be implemented in different ways and for different purposes. However, these different implementations typically have certain common characteristics. For example, in certain instantiations, blockchains are generally distributed across various systems, each of which maintains a copy of the blockchain. Updates to one copy of the blockchain, such as the addition of a user profile block 'n' 914, results in corresponding updates to the other copies. Accordingly, the contents of the blockchain, including its most recent updates, are available to all participating users of the blockchain, who in turn use their own systems to authenticate and verify each new block. This process of authentication and verification ensures that the same transaction does not occur more than once. Furthermore, with distributed types of block chains, the legitimacy of a given block, and its associated contents, is only certified once a majority of participants agree to its validity.

In general, the distributed and replicated nature of a blockchain, such as a user profile blockchain 908, makes it difficult to modify historical records without invalidating any subsequent blocks added thereafter. Consequently, the user behavior data within a given user profile blockchain 908 is essentially immutable and tamper-evident. However, this immutability and tamper-evidence does not necessarily ensure that the user behavior data recorded in the user profile blockchain 908 can be accepted as an incontrovertible truth. Instead, it simply means that what was originally recorded was agreed upon by a majority of the user profile blockchain's 908 participants.

Certain embodiments of the invention reflect an appreciation that every transaction in a blockchain is serialized (i.e., stored in a sequence). Additionally, in certain embodiments, every transaction in a blockchain is time-stamped, which is useful for tracking interactions between participants and verifying various information contained in, or related to, a particular blockchain. Furthermore, instructions may be embedded within individual blocks of a blockchain. These instructions, in the form of computer-executable code, allow transactions or other operations to be initiated if certain conditions are met.

Certain embodiments of the invention likewise reflect an appreciation that while blockchains are typically implemented as a decentralized, distributed data structure whose contents are replicated across a number of systems, they may also be implemented in other ways. Accordingly, the user profile blockchain 908 may be implemented in certain embodiments to be stored as a single instance on a system, whether physical or virtual, at a single address. In certain embodiments, individual user profile blocks '1' 910, '2' 912 through 'n' 914 may be centrally stored at different addresses on the same system. In certain embodiments, a single instance of user profile blocks '1' 910, '2' 912, through 'n' 914 may be stored individually on two or more systems, each with a corresponding, unique address.

In certain embodiments, individual user profile blockchains 908 associated with a given user profile 906 may be stored at a single address on a system. In certain embodiments, individual user profile blockchains 908 associated with a given user profile 906 may be stored individually on two or more systems, each with a corresponding, unique address. In certain embodiments, individual user profile blockchains 908 associated with a given user profile 906 may be stored on two or more systems, each with a corresponding, unique address. Those of skill in the art will recognize that many such embodiments are possible. Accordingly, the foregoing is not intended to limit the spirit, scope or intent of the invention.

Referring now to FIG. 9, groups of user behavior elements 902, described in greater detail herein, may be combined in various embodiments to generate one or more associated user profile elements 904, likewise described in greater detail herein. In certain embodiments, the resulting user profile elements 904 may in turn be combined to generate a user profile block, such as user profile block 'n' 914. As used herein, a user profile block broadly refers to a blockchain block implemented to contain various user profile information. As likewise used herein, user profile information broadly refers to any entity information, entity identifier information, behavior element information, temporal information, contextual information, or combination thereof, associated with a user profile, as described in greater detail herein. The resulting user profile block is then appended to a target user profile blockchain 908. In certain embodiments, the user profile blockchain 908, or a portion thereof, may be implemented as a user profile 606. In certain embodiments, the user profile 906 may be implemented to contain user profile information not contained in the user profile blockchain 908.

In certain embodiments, the user profile blockchain 908 may be implemented to be associated with an individual entity. In these embodiments, user behavior blocks '1' 910 and '2' 912 through 'n' 914 are associated with the individual entity. In certain embodiments, the user profile blockchain 908 may be implemented to be associated with two or more entities. In these embodiments, individual user behavior blocks '1' 910 and '2' 912 through 'n' 914 may be respectively associated with two or more user profiles 906, which in turn are respectively associated with a particular entity. In certain embodiments, the user profile blockchain 908 may be parsed to identify which of the user profile blocks '1' 910 and '2' 912 through 'n' 914 are associated with a given user profile 906, which in turn is respectively associated with a particular entity.

In certain embodiments, data associated with a given user profile blockchain 908 may be used in the performance of user behavior monitoring operations to detect acceptable, anomalous, malicious and unknown behavior enacted by a user. In certain embodiments, the performance of these user behavior monitoring operations may involve comparing a newly-generated user profile block, such as user profile block 'n' 914 to previously-generated user behavior blocks, such as user profile blocks '1' 912 and '2' 912.

In certain embodiments, if the contents of the user profile block 'n' 914 are substantively similar to the contents of user profile blocks '1' 910 and '2' 912, then the behavior of the user may be judged to be acceptable. However, if the contents of the user profile block 'n' 914 are substantively dissimilar to the contents of user profile blocks '1' 910 and '2' 912, then the behavior of the user may be judged to be anomalous, malicious or unknown. In these embodiments, the method by which the contents of user profile block 'n' 914 are determined to be substantively similar, or dissimilar, to the contents of user profile blocks '1' 910 and '2' 912 is a matter of design choice.

Figure 10:
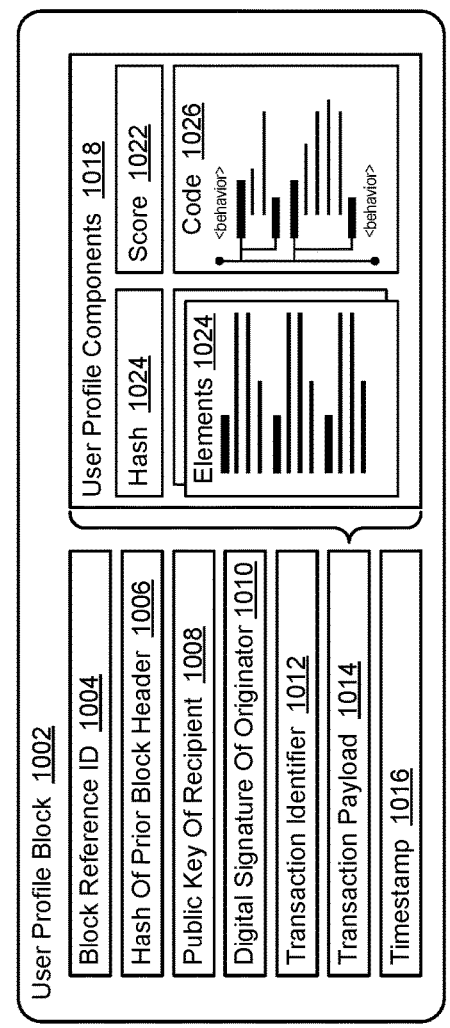
FIG. 10 is a simplified block diagram of a user profile block in a blockchain.

FIG. 10 is a simplified block diagram of a user profile block in a blockchain implemented in accordance with an embodiment of the invention. In certain embodiments, a cyberprofile blockchain 908, as shown in FIG. 9, may contain one or more user profile blocks 1002, such as user profile blocks '1' 910, '2' 912, through 'n' 914, likewise shown in FIG. 9. In these embodiments, each user profile block 1002 may include data, metadata or both, such as a block reference identifier (ID) 1004, a hash value 1006 of the prior user profile block's header information, the public key of the recipient 1008 of the user profile blockchain transaction, and the digital signature of the originator 1010 of the user profile blockchain transaction. The user profile block 1002 may likewise include additional data, metadata, or both, such as a user profile blockchain transaction identifier 1012, a transaction payload 1014, and a transaction timestamp 1016.

In certain embodiments, the transaction payload 1014 may include one or more user profile components 1018. In certain embodiments, the user profile components 1018 may include various user profile elements 1024, described in greater detail herein, and a hash 1024 value of the user profile elements 1024. In certain embodiments, the user profile elements 1024 may likewise include associated user behavior elements, in their entirety or a portion thereof. In certain embodiments, the user profile element hash 1022 value is implemented to determine whether the integrity of the cyberprofile elements 1024 has been compromised.

In certain embodiments, the user profile components 1018 may include executable code 1026. In certain embodiments, the executable code 1026 may be implemented to access a user profile blockchain associated with the user profile elements 1024. In certain embodiments, the executable code 1026 may be used by a user profile management system, described in greater detail herein, to detect acceptable, anomalous, malicious and unknown behavior being enacted by a user. In certain embodiments, user behavior data contained in one or more user profile elements 1024 may be used in combination with the executable code 1026 to perform user behavior monitoring operations, likewise described in greater detail herein.

In certain embodiments, the executable code 1026 may include state information, such as pre-calculated information associated with one or more user profile elements 1024. In certain embodiments, the executable code 1026 may include a model of good behavior which is used when detecting acceptable, anomalous, malicious and unknown behavior being enacted by a user. In certain embodiments, the model may include a series of rules of behaviors that might lead to a determination regarding trustworthiness. In certain embodiments, the series of rules may include communication related rules, data movement related rules and/or programming modification type rules. In certain embodiments, such a model may enable the user profile management system to assess an intent of a user.

In certain embodiments, the user profile components 1018 may also contain a risk 1022 score. In certain embodiments, the risk 1022 score may be used by a user profile management system to assess the state (e.g., the risk or trustworthiness) of a particular user while enacting a given user behavior. In certain embodiments, the state may also be stored within the user profile block 1002. In certain embodiments, the state is assessed at a specific time and has a timestamp or other temporal information associated with the state. In one embodiment, the user risk 1022 score might be associated with a particular user behavior element, such as accessing sensitive human resource documents. In certain embodiments, the risk 1022 score might be related to a user's overall user behavior. In certain embodiments, the user profile block 1002 may also contain information regarding how the risk 1022 score was generated, such as the model that was used. Certain embodiments of the invention reflect an appreciation that the storing of this information assists in providing a historical view of how the risk 1022 score was generated when it was generated. Certain embodiments of the invention likewise reflect an appreciation that this information can be useful in identifying what type of user behavior led to the risk 1022 score (e.g., what was the anomaly).

As an example, a user may have a low risk 1022 score for general cyberspace activity, but a high risk 1022 score for accessing an organization's financial data. To continue the example, the user's role in the organization may be related to maintaining a physical facility. In that role, the user may requisition cleaning supplies and schedule other users to perform maintenance. Accordingly, attempting to access the organization's financial data, particularly over a weekend, would indicate anomalous, or possibly malicious, behavior. To continue the example, such an attempt may result in a high risk 1022 score being assigned to that particular user behavior element. In certain embodiments, the risk 1022 score may change as a result of information obtained from a third party and not just from observable behavior. For example, a user's credit score changes, or the user performs a wire transfer to a known suspicious location, then the risk 1022 score may adjusted accordingly.

Figure 11:
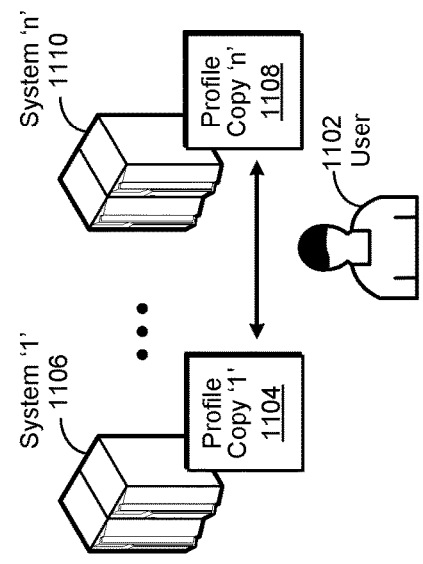
FIG. 11 is a simplified block diagram of a transportable user profile.

FIG. 11 is a simplified block diagram of a transportable user profile implemented in accordance with an embodiment of the invention. In certain embodiments, a first copy of a user profile, such as user profile copy '1' 1104 shown in FIG. 11, is used by a first system, such as system '1' 1106, likewise shown in FIG. 11. In certain embodiments, additional copies of the user profile, such as user profile copy 'n' 1108, are used by additional systems 'n' 1110 to perform various user behavior monitoring operations. In certain embodiments, additions to user profile copy '1' 1104 results in the same additions to user profile copies 'n' 1108. As a result, systems '1' 1106 through 'n' 1110 are kept in synch regarding the user's 1102 user behavior. Accordingly, each system '1' 1104 through 'n' 1110 is apprised of any anomalous or malicious user behavior enacted by the user 1102, regardless of which system was being used when the anomalous or malicious behavior occurred.

Figure 12:
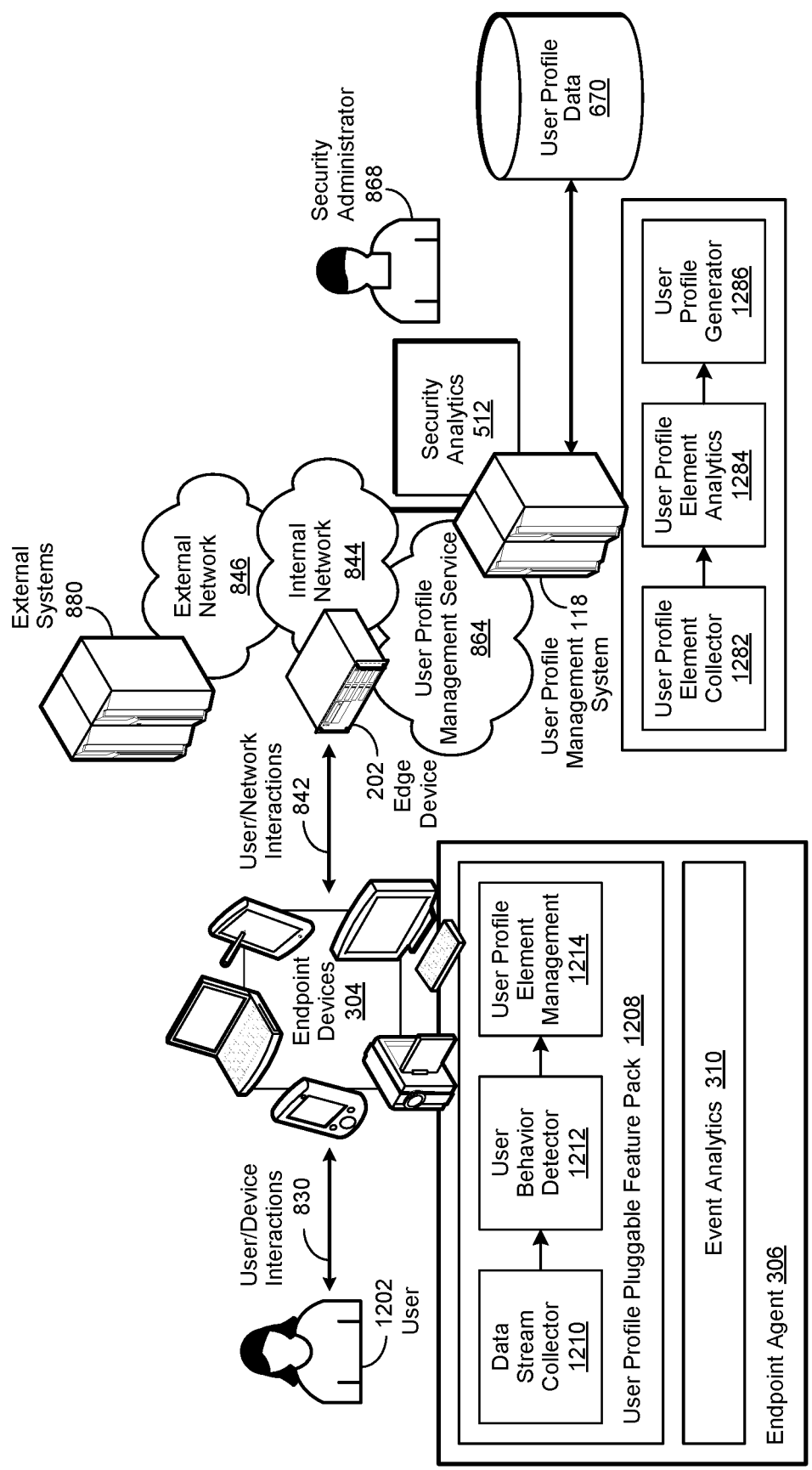
FIG. 12 is a simplified block diagram of the performance of user profile definition and management operations.

FIG. 12 is a simplified block diagram of the performance of user profile definition and management operations implemented in accordance with an embodiment of the invention. In certain embodiments, user behavior associated with a user 1202 may be monitored. In certain embodiments, the user behavior may be monitored during user/device interactions 830 between the user 1202 and an endpoint device 304. In certain embodiments, as described in greater detail herein, an endpoint agent 306 may be implemented on the endpoint device 304 to perform the user behavior monitoring. In certain embodiments, the endpoint agent 306 may be implemented in combination with a user profile management system 118 to perform the user behavior monitoring, to define or manage a user profile, or a combination thereof.

In certain embodiments, the endpoint agent 306 may be implemented to include an event analytics 310 module and a user profile pluggable feature pack 1208. In certain embodiments, the user profile pluggable feature pack 1208 may be further implemented to include a data stream collector 1210 module, a user behavior element detector 1212 module, and a user profile element management 1214 module. In certain embodiments, the data stream collector 1210 module may be implemented to capture data streams resulting from user/device interactions 630 between a user 1202 and a corresponding endpoint device 304. In certain embodiments, the data stream collector 1210 module may be implemented to capture data streams resulting to user/network interactions 842 between an endpoint device 304 and an edge device 202. In certain embodiments, certain user/network interactions 842 may be associated with certain user/device interactions 830.

In certain embodiments, the user behavior detector 1212 module may be implemented to identify various user behavior elements in the resulting data streams, which may then be provided to the user profile element management 1014 module. In certain embodiments, the user profile element management 1014 module may be implemented to process the resulting user behavior elements into user profile elements, described in greater detail herein. In turn, the user profile element management 1214 module may be implemented in certain embodiments to provide the resulting user profile elements to the user profile management service 118.

In certain embodiments, the user profile management system 118 may be implemented to include a user profile element collector 1282 module, a user profile analytics 1284 module, and a user profile generator 1286 module. In certain embodiments, user profile elements received by the user profile management service 118 may be provided to the user profile element collector 1282. In certain embodiments, the user profile elements received by the user profile element collector 1282 are then provided to the user profile analytics 1284 module for analysis.

In certain embodiments, the profile analytics 1284 module may be implemented to process the user profile elements to determine, as described in greater detail herein, whether user behavior associated with the user profile elements may be anomalous, abnormal or malicious. In certain embodiments, the user profile management system 118 may be implemented to receive information from the user profile analytics 1284 module that certain user behavior associated with various user profile elements may be anomalous, abnormal or malicious.

In turn, the user profile generator 1286 module may be implemented in certain embodiments to process the user profile elements, and other associated information, to generate a user profile, described in greater detail herein. In certain embodiments, the user profile generator 1286 may likewise be implemented to process the user profile elements to associate them with a preexisting user profile. In certain embodiments, the user profile may likewise be associated with other user profiles, other associated information, or a combination thereof.

Accordingly, the user profile management system 118 may be implemented in certain embodiments to provide the information to a security analytics 512 system, described in greater detail herein, to determine whether a remedial action should be performed. In certain embodiments, the security analytics 512 system may be implemented to perform the remedial action automatically. In certain embodiments, the security analytics 512 system may be implemented to provide certain information to a security administrator 868, who in turn may manually perform the remedial action.

Figure 13:
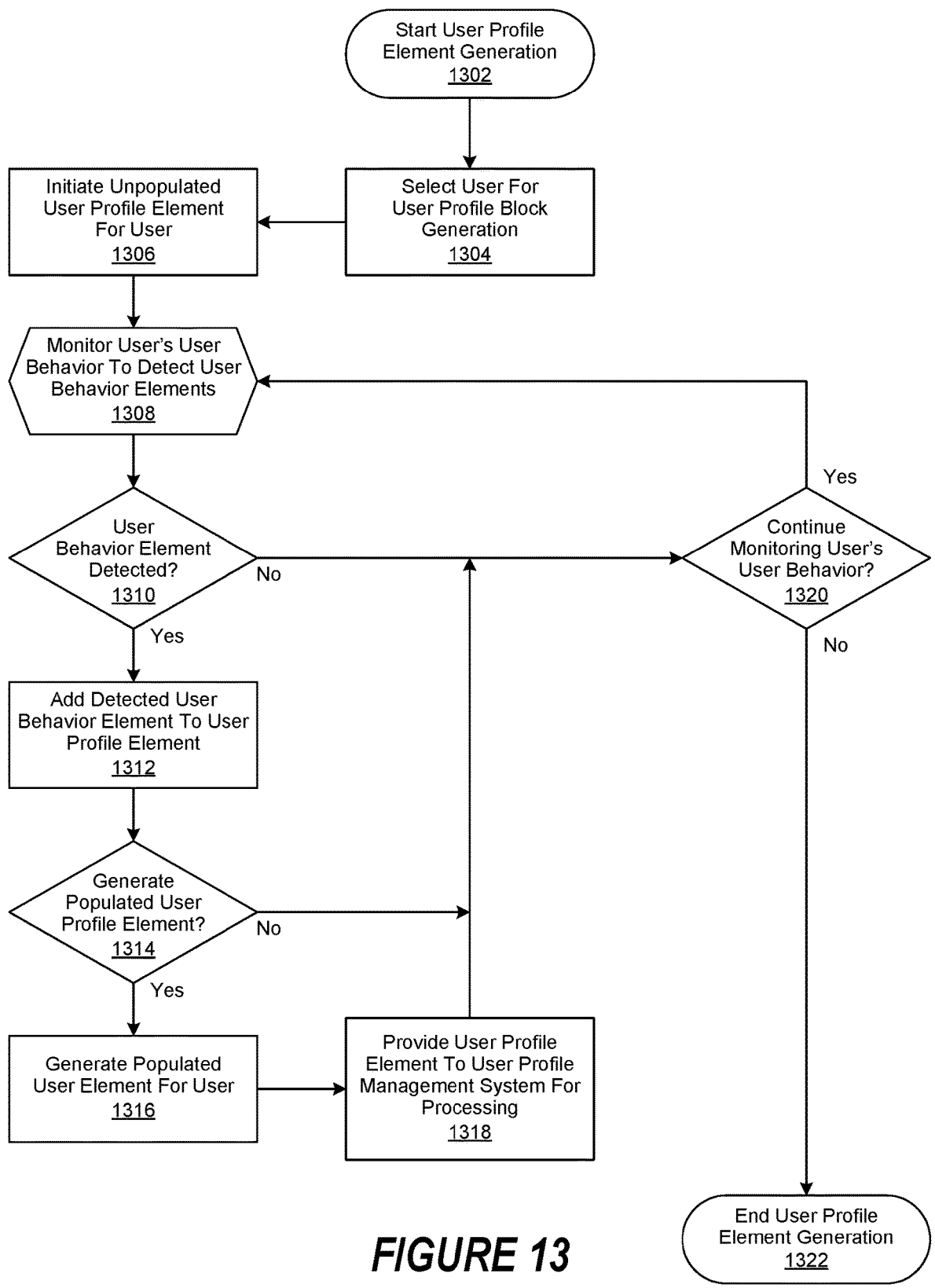
FIG. 13 is a generalized flowchart of the performance of user profile element generation operations.

FIG. 13 is a generalized flowchart of user profile element generation operations performed in accordance with an embodiment of the invention. In this embodiment, user profile element generation operations are begun in step 1302, followed by the selection of a user in step 1304 for associated user profile block generation. An unpopulated user profile element for the selected user is then initiated in step 1306, followed by the performance of ongoing monitoring operations being performed in step 1308 to detect user behavior elements associated with the selected user's user behavior.

A determination is then made in step 1310 whether a user behavior element has been detected. If not, then a determination is made in step 1320 whether to continue monitoring the user's user behavior to detect associated user behavior elements. If so, then the process is continued, proceeding with step 1308. Otherwise, user profile element generation operations are ended in step 1322. However, if it was determined in step 1310 that a user behavior element was detected, then the detected user behavior element is added to the previously-generated user profile element in step 1312.

A determination is then made in step 1314 whether to generate a populated user profile element from any associated user behavior elements. If not, then the process is continued, proceeding with step 1320. Otherwise, a populated user profile element is generated from its associated user behavior elements in step 1316. The resulting populated user profile element is then provided in step 1318 to a user profile definition and management system for further processing, as described in greater detail herein. Thereafter, of if it was determined in step 1314 to not generate a populated user profile element, the process is continued, proceeding with step 1320.

FIGS. 12a and 12b are a generalized flowchart of the performance of transportable cyberprofile generation operations implemented in accordance with an embodiment of the invention. In this embodiment, transportable cyberprofile generation operations are begun in step 1202, followed by ongoing operations being performed by a blockchain access management system in step 1204 to receive cyberprofile elements, as described in greater detail herein. A determination is then made in step 1206 whether a cyberprofile element has been received by the blockchain access management system.

If not, then a determination is made in step 1228 to determine whether to continue ongoing operations to receive cyberprofile elements. If so, then the process is continued, proceeding with step 1204. Otherwise, a determination is made in step 1230 whether to end transportable cyberprofile generation operations. If not, then the process is continued, proceeding with step 1204. Otherwise, transportable cyberprofile generation operations are ended in step 1232.

However, if it was determined in step 1206 that a cyberprofile element was received, then it is processed in step 1208 to determine its associated entity. A determination is then made in step 1210 to determine whether other cyberprofile elements associated with the same entity have been received by the blockchain access management system. If so, then the most recently received cyberprofile element is associated with the other cyberprofile elements corresponding to the same entity in step 1212.

Thereafter, or if it was determined in step 1210 that no other cyberprofile elements corresponding to the entity have been received, then a determination is made in step 1214 whether to generate a cyberprofile block, described in greater detail herein. If not, then the process is continued, proceeding with step 1228. Otherwise, the cyberprofile elements corresponding to the same entity are processed in step 1216 with any other related cyberprofile information, likewise described in greater detail herein, to generate a cyberprofile block.

Then, in step 1218, the cyberprofile elements associated with the resulting cyberprofile block are stored in a repository of user behavior profile data at a selected address. The selected address for the cyberprofile elements are then cross-referenced, or otherwise indexed, to the cyberprofile block's identifier in step 1220. The cyberprofile elements are then processed in step 1222 with their corresponding address to generate an element hash value, described in greater detail herein. The resulting element hash value, and the address of the stored cyberprofile elements, are then stored in the cyberprofile block in step 1224. The cyberprofile block is then processed in step 1226 to associate it with its corresponding transportable cyberprofile. The process is then continued, proceeding with step 1230.

FIG. 13 is a generalized flowchart of the performance of transportable cyberprofile management operations implemented in accordance with an embodiment of the invention. In this embodiment, transportable cyberprofile management operations are begun in step 1302, followed by ongoing operations being performed in step 1304 to monitor cyber behavior for anomalous events, such as a data breach or a cyberprofile being compromised. A determination is then made in step 1306 whether an anomalous event has been detected. If not, then a determination is made in step 1322 whether to continue ongoing operations to monitor cyber behavior for anomalous events. If so, then the process is continued, proceeding with step 1304.

However, if it was determined in step 1306 that an anomalous event was detected, then threat analysis operations are performed in step 1308, followed by a determination being made in step 1310 if the anomalous event represents a threat to a particular cyberprofile. If not, then the process is continued, proceeding with step 1322. Otherwise, cyberprofile elements associated with the affected cyberprofile are identified in step 1312. The address referencing the storage location of the associated cyberprofile elements are then changed in step 1314, followed by information related to the anomalous event, and the changed address of the cyberprofile elements, being logged in step 1316. In certain embodiments, the changing of the address of the cyberprofile elements, and the logging of the information related to the anomalous event, may be performed by a blockchain access management system, described in greater detail herein. The cyberprofile is then processed in step 1318 to reflect that the address of its associated cyberprofile elements has been changed. Threat remediation operations are then performed in step 1320 and the process is continued, proceeding with step 1322.

Figure 14A:
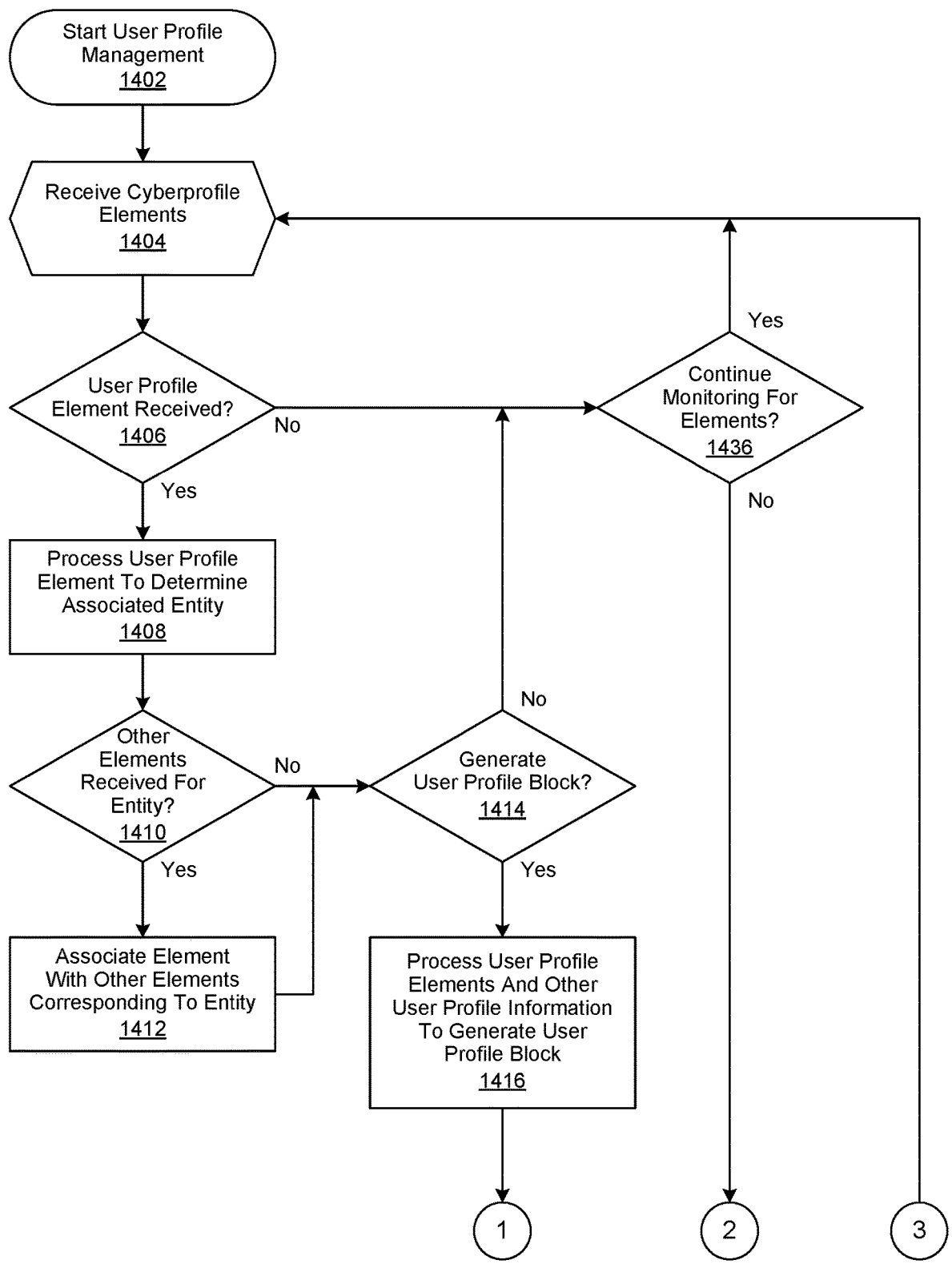
FIGS. 14a and 14b are a generalized flowchart of the performance of user profile definition and management operations.
Figure 14B:
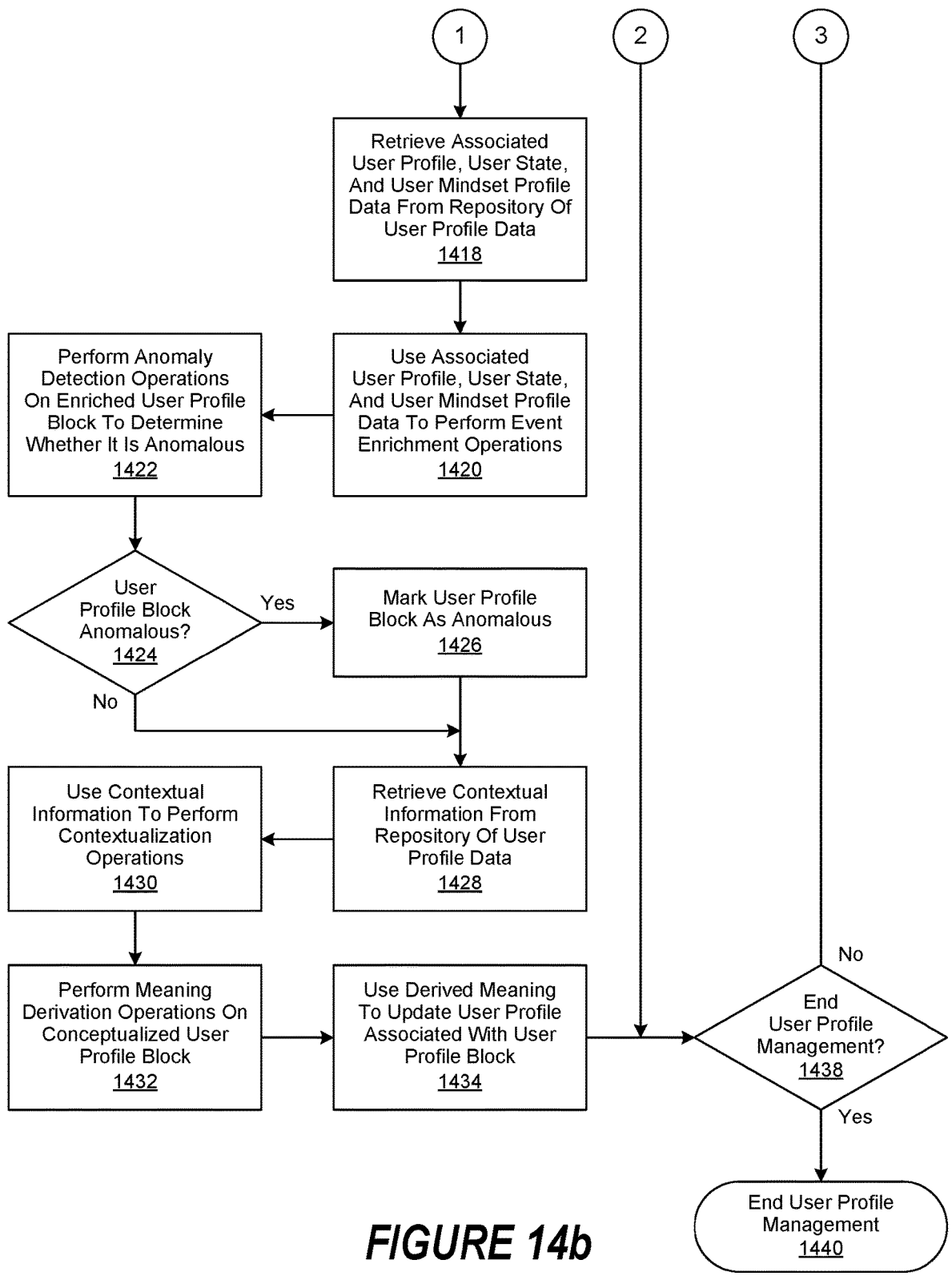

FIGS. 14*a* and 14*b* are a generalized flowchart of the performance of user profile definition and management operations implemented in accordance with an embodiment of the invention. In this embodiment, user profile definition and management operations are begun in step 1402, followed by ongoing operations being performed by a user profile management system in step 1404 to receive user profile elements, as described in greater detail herein. A determination is then made in step 1406 whether a user profile element has been received by the user profile management system.

If not, then a determination is made in step 1436 to determine whether to continue monitoring for user profile elements. If so, then the process is continued, proceeding with step 1404. Otherwise, a determination is made in step 1438 whether to end transportable cyberprofile generation operations. If not, then the process is continued, proceeding with step 1404. Otherwise, user profile definition and management operations are ended in step 1440.

However, if it was determined in step 1406 that a user profile element was received, then it is processed in step 1408 to determine its associated entity. A determination is then made in step 1410 to determine whether other user profile elements associated with the same entity have been received by the user profile management system. If so, then the most recently received user profile element is associated with the other user profile elements corresponding to the same entity in step 1412.

Thereafter, or if it was determined in step 1410 that no other user profile elements corresponding to the entity have been received, then a determination is made in step 1414 whether to generate a user profile block, described in greater detail herein. If not, then the process is continued, proceeding with step 1424. Otherwise, the user profile elements corresponding to the same entity are processed in step 1416 with any other related user profile information, likewise described in greater detail herein, to generate a user profile block.

Then in step 1418, certain user profile, user state, and user mindset profile data stored in a repository of user profile data is retrieved and then used in step 1420 to perform event enrichment operations, described in greater detail herein, on the user profile block. Anomaly detection operations, likewise described in greater detail herein, are then performed in step 1422 on the resulting enriched information associated with the user profile block to determine whether it is anomalous. Thereafter, a determination is made in step 1424 to determine whether the user profile block is anomalous. If so, it is marked as anomalous in step 1426. Thereafter, or if it was determined in step 1424 the user profile block was not anomalous, then certain contextualization information stored in the repository of user profile data is then retrieved in step 1428.

The retrieved contextualization information is then used in step 1430 to perform contextualization operations on the user profile block to provide context. Meaning derivation operations are then performed on the contextualized user profile block in step 1432 to derive meaning from the user profile block. In certain embodiments, the derivation of meaning may include inferring the intent of an entity associated with the user profile block. The derived meaning is then used in step 1434 to update the user profile corresponding to the user profile block. The process is then continued, proceeding with step 1436.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a security analysis operation within a security environment, comprising:

monitoring electronically-observable user behavior about a particular entity;

maintaining a state about the particular entity, the state representing a context of a particular event;

converting the electronically-observable user behavior into electronic information representing the electronically-observable user behavior;

generating a user behavior profile based upon the electronic information representing the electronically-observable user behavior, the user behavior profile comprising a collection of information that describes the particular entity, the collection of information comprising at least one of a user profile attribute, a user behavior factor and a user mindset factor;

generating a collection of information reflecting an inferred state of a user at a particular time, the collection of information reflecting the inferred state of the user at the particular time representing aspects of the particular entity that are inferred based upon the electronically-observable user behavior;

performing a security analysis operation via a security analytics system, the security analysis operation analyzing the event using the state of the entity, the collection of information reflecting the inferred state of the user at the particular time and the user behavior profile, the analyzing determining whether the electronically-observable user behavior about the particular entity does not correspond to known good behavior, the security analysis operation determining that the particular entity represents a security threat to an organization associated with the security analytics system when the electronically-observable user behavior about the particular entity does not correspond to known good behavior; and, performing an enforcement operation when the electronically-observable user behavior about the particular entity does not correspond to known good behavior.

2. The method of claim 1, further comprising:
associating the collection of information reflecting the inferred state of the user at the particular time with the user behavior profile.

3. The method of claim 1, further comprising:
associating a higher-level meaning with the event based upon the analyzing.

4. The method of claim 1, further comprising:
using the user behavior profile and the state to generate a user mindset profile.

5. The method of claim 1, wherein:
the monitoring electronically-observable user behavior comprises monitoring a plurality of points of observability, at least some of the plurality of points of observability corresponding to respective layers of user interaction; and,
each of the plurality of points of observability is converted into respective electronic information representing respective points of observability.

6. The method of claim 5, wherein:
the plurality of points of observability comprise an action based point of observability, an activity based point of observability and a behavior based point of observability.

7. The method of claim 5, wherein:
the plurality of points of observability observer user behavior within at least one of a physical domain and a cyberspace environment.

8. The method of claim 1, wherein:
the user behavior profile comprises a multi-faceted user behavior profile comprising a plurality of facets, each of the plurality of facets corresponding to at least one of a user authentication factor, a user identification factor and a user behavior factor.

9. The method of claim 1, further comprising:
identifying certain electronically-observable user behavior used for generating the user behavior profile as known good behavior;
determining whether additional electronically-observable user behavior do not correspond to the known good behavior; and,
performing an enforcement operation when additional electronically-observable user behavior do not correspond to the known good behavior.

10. The method of claim 8, further comprising:
monitoring an information technology environment using the user behavior profile;
performing an enforcement operation if a user interaction with the information technology environment does not correspond to interactions based upon the user behavior profile.

11. A system comprising:
a processor;
a data bus coupled to the processor; and
a non-transitory, computer-readable storage medium embodying computer program code for generating a user behavior profile, the non-transitory, computer-readable storage medium being coupled to the data bus, the computer program code interacting with a plurality of computer operations and comprising instructions executable by the processor and configured for:
monitoring electronically-observable user behavior about a particular entity;
maintaining a state about the particular entity, the state representing a context of a particular event;
converting the electronically-observable user behavior into electronic information representing the electronically-observable user behavior;
generating a user behavior profile based upon the electronic information representing the electronically-observable user behavior, the user behavior profile comprising a collection of information that describes the particular entity, the collection of information comprising at least one of a user profile attribute, a user behavior factor and a user mindset factor;
generating a collection of information reflecting an inferred state of a user at a particular time, the collection of information reflecting the inferred state of the user at the particular time representing aspects of the particular entity that are inferred based upon the electronically-observable user behavior;
performing a security analysis operation via a security analytics system, the security analysis operation analyzing the event using the state of the entity, the collection of information reflecting the inferred state of the user at the particular time and the user behavior profile, the analyzing determining whether the electronically-observable user behavior about the particular entity does not correspond to known good behavior, the security analysis operation determining that the particular entity represents a security threat to an organization associated with the security analytics system when the electronically-observable user behavior about the particular entity does not correspond to known good behavior; and,
performing an enforcement operation when the electronically-observable user behavior about the particular entity does not correspond to known good behavior.

12. The system of claim 11, wherein the instructions executable by the processor are further configured for:
associating the collection of information reflecting the inferred state of the user at the particular time with the user behavior profile.

13. The system of claim 11, wherein the instructions executable by the processor are further configured for:
associating a higher-level meaning with the event based upon the analyzing.

14. The system of claim 11, wherein the instructions executable by the processor are further configured for:
using the user behavior profile and the state to generate a user mindset profile.

15. The system of claim 11, wherein:
the monitoring electronically-observable user behavior comprises monitoring a plurality of points of observability, at least some of the plurality of points of observability corresponding to respective layers of user interaction; and,
each of the plurality of points of observability is converted into respective electronic information representing respective points of observability.

16. The system of claim 15, wherein:
the plurality of points of observability comprise an action based point of observability, an activity based point of observability and a behavior based point of observability.

17. The system of claim 15, wherein:
the plurality of points of observability observer user behavior within at least one of a physical domain and a cyberspace environment.

18. The system of claim 11, wherein:
the user behavior profile comprises a multi-faceted user behavior profile comprising a plurality of facets, each of the plurality of facets corresponding to at least one of a user authentication factor, a user identification factor and a user behavior factor.

19. The system of claim 18, wherein the instructions executable by the processor are further configured for:
identifying certain electronically-observable user behavior used for generating the user behavior profile as known good behavior;
determining whether additional electronically-observable user behavior do not correspond to the known good behavior; and,
performing an enforcement operation when additional electronically-observable user behavior do not correspond to the known good behavior.

20. The system of claim 18, wherein the instructions executable by the processor are further configured for:
monitoring an information technology environment using the plurality of user behavior profiles;
performing an enforcement operation if a user interaction with the information technology environment does not correspond to interactions based upon at least one of the plurality of user behavior profiles.

* * * * *